United States Patent
Chacko et al.

(10) Patent No.: US 11,410,119 B1
(45) Date of Patent: Aug. 9, 2022

(54) SYSTEM TO DETERMINE USER INTERACTION WITH FIXTURE

(71) Applicant: AMAZON TECHNOLOGIES, INC., Seattle, WA (US)

(72) Inventors: Nikhil Chacko, Seattle, WA (US); Robert Crandall, Seattle, WA (US); Paul Eugene Munger, Seattle, WA (US); Liefeng Bo, Seattle, WA (US); Gerard Guy Medioni, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 296 days.

(21) Appl. No.: 15/195,964

(22) Filed: Jun. 28, 2016

(51) Int. Cl.
  *G06Q 10/08* (2012.01)
  *H04N 5/225* (2006.01)

(52) U.S. Cl.
  CPC .......... *G06Q 10/087* (2013.01); *H04N 5/225* (2013.01)

(58) Field of Classification Search
  CPC .................... G06Q 10/087; H04N 5/225
  See application file for complete search history.

(56) References Cited

U.S. PATENT DOCUMENTS

| | | | |
|---|---|---|---|
| 7,225,980 B2 | 6/2007 | Ku et al. | |
| 7,949,568 B2* | 5/2011 | Fano | G06K 9/00 356/4.03 |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2014/0201041 A1* | 7/2014 | Meyer | G06Q 10/087 705/28 |
| 2014/0201042 A1* | 7/2014 | Meyer | G06Q 10/087 705/28 |

(Continued)

OTHER PUBLICATIONS

Video from YouTube video clip entitled "Weight Sensing Shelves," 3:20 duration, uploaded on Sep. 24, 2015 by user "Andrew Dimech". Retrieved from Internet: <https://www.youtube.com/watch?v=71GboW_pWWc> (Year: 2015).*

(Continued)

*Primary Examiner* — A. Hunter Wilder
*Assistant Examiner* — Joseph M Mutschler
(74) *Attorney, Agent, or Firm* — Lindauer Law, PLLC

(57) ABSTRACT

A user undertakes an event, such as adding, removing, or otherwise interacting with an item stowed at a fixture. Using successive samples of weight data that occur during an event, a plurality of vectors are generated that are indicative of a weight change and a location associated with the fixture. The vectors are processed to determine where within the fixture the event took place. Hypotheses are generated that describe predicted interactions involving predicted locations that correspond to those indicated by the vectors. The hypotheses are ranked and then one is selected as a solution. The predicted values associated with the selected hypothesis are then used to generate interaction data that indicates one or more types of item and quantities of the items that were added, removed, or otherwise handled by the user.

25 Claims, 9 Drawing Sheets

(56) References Cited

U.S. PATENT DOCUMENTS

| | | | | |
|---|---|---|---|---|
| 2014/0297487 | A1* | 10/2014 | Bashkin | G06Q 10/087 705/28 |
| 2015/0086107 | A1 | 3/2015 | Dedeoglu et al. | |
| 2017/0228686 | A1* | 8/2017 | Bermudez Rodriguez | G06Q 10/087 |
| 2017/0234746 | A1* | 8/2017 | Cohen | G06F 3/0414 73/1.08 |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/view/doc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

\* cited by examiner

SYSTEM TO DETERMINE USER INTERACTION WITH FIXTURE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
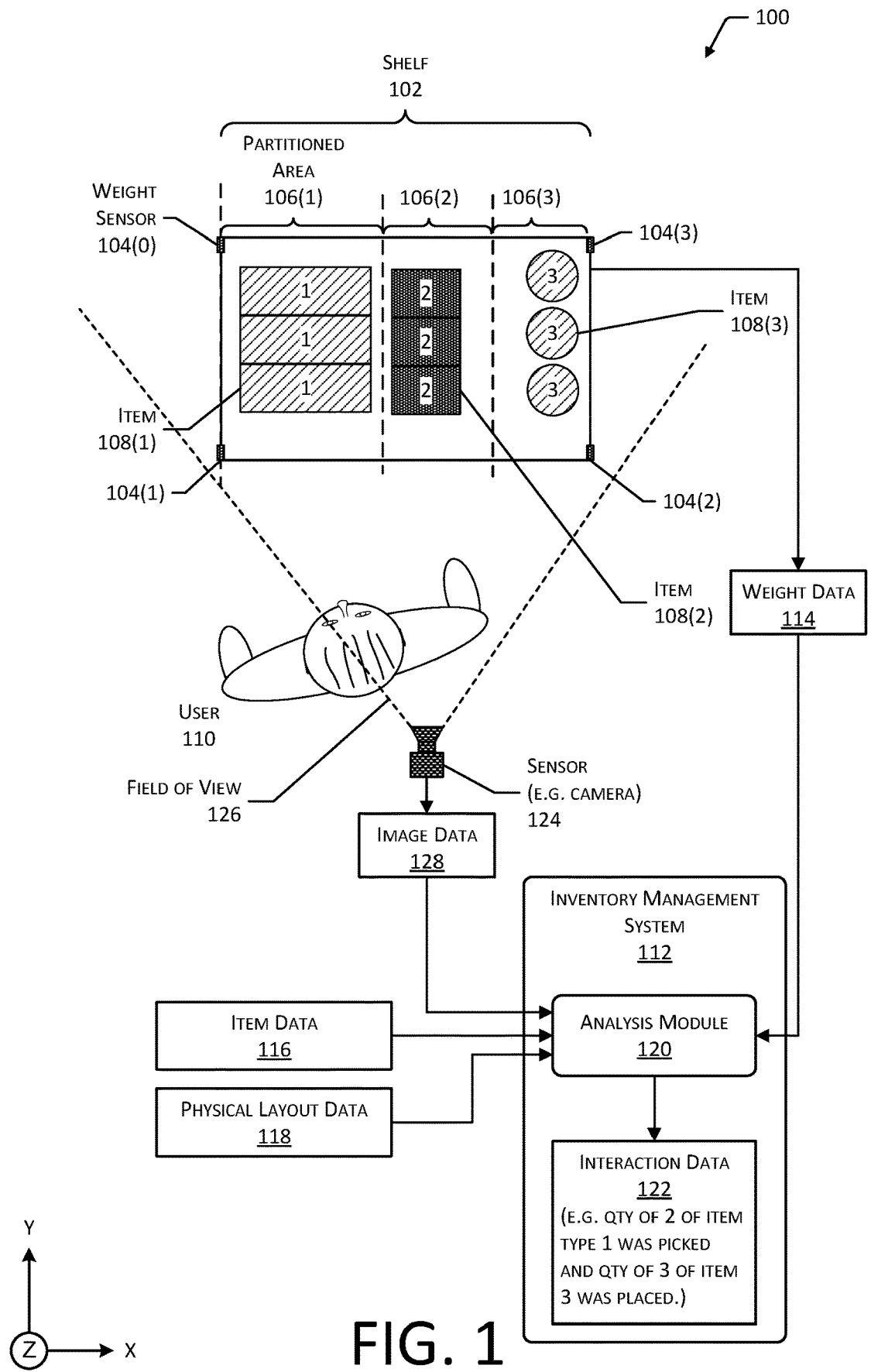
FIG. 1 illustrates a system to determine interaction data about the pick (removal) or place (return or loading) of items stowed on a shelf, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing weight data from weight sensors. The weight data may be used to determine interactions with items stowed or otherwise held in fixtures in a materials handling facility (facility) or other setting. The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using one or more sensors to acquire sensor data about interactions in the facility. Interactions may comprise the user picking an item from a fixture, placing an item at a fixture, touching an item, bringing an object such as a hand or face close to an item, and so forth. For example, the inventory management system may generate interaction data that indicates what item a user picked from a particular fixture, and then use this interaction data to adjust the count of inventory stowed at the particular fixture.

The weight sensors may be used to gather weight data about items stowed at a fixture, such as a shelf. For example, load cells at or near each end of the shelf, at or near each of the four corners of a rectangular shelf, or in other configurations, may generate weight data indicative of a load at the fixture.

The weight data may be used to determine data such as a quantity of items that have been picked from or placed to a fixture, to determine the identity of a type of item that has been picked from or placed to the fixture, and so forth. Use of weight sensors and the weight data offers several operational benefits, especially in a materials handling facility or other facility. These benefits may include mechanical robustness, relatively low cost for installation and maintenance, fast response times, and so forth.

A single fixture, such as a shelf, may have several partitioned areas, such as lanes, within which particular types of items are arranged. For example, the fixture may be a shelf having three lanes, with a different type of pet food in each lane. For example, a first lane may store "Cat Food", a second lane may store "Dog Food", and a third lane may store "Fish Food".

The weight sensors may produce weight signals that are processed to reduce noise in the weight signals. For example, a signal conditioning module may use a piecewise-constant fitting algorithm to provide edge-preserving noise reduction of the weight signals. The resulting weight signal may be processed using a coarse event detection module that determines a coarse interval of time within which the weight signals changed beyond a threshold value. The coarse event detection module may output weight data for this coarse interval, and in some implementations, weight data occurring for some time before and after the coarse interval. The signal conditioning module and the coarse event detection module may be located at or proximate to the weight sensors of the fixture.

The weight data may be sent to a computing device, such as a server. The weight data comprises a plurality of samples. Each sample comprises weight values obtained by the weight sensors at a particular time. The weight data is then processed by a change detection module to generate event data. An event is when the weight data changes in such a fashion as to indicate that a pick or place of an item has occurred at the fixture. The event data determines the occurrence of these events in the weight data. The event data may comprise information such as a timestamp of an event start time, a timestamp of the event end time, as well as the weight values from the weight sensors obtained during the event.

A measured weight change may be calculated, looking for the overall change in weight at the fixture between the event start time and the event end time. This measured weight change may be used by a hypothesis generation module to generate a set of hypotheses, with each hypothesis expressing a different combination of predicted types of interactions (such as pick or place), predicted types of items, predicted quantity of those types of items, and so forth.

The hypotheses generation may utilize item data. The item data provides information about one or more of the items. This information may include the partitioned area(s) in which the item is known to be stowed, weight of an individual item, current quantity on hand, and so forth. In some implementations, the hypotheses generation may utilize physical layout data. The physical layout data provides information about the fixture, such as dimensions, position of the weight sensors, tare weight, dimensions of a partitioned area, and so forth. For example, by using the partitioned area dimensions and known information about where types of items are stowed and how much those types of items weigh, hypotheses for different combinations of pick and place may be generated for a particular shelf. In some implementations, the generation of the hypotheses may be constrained. For example, the event vector data that is described in more detail below may be used to determine that a particular partitioned area experienced an interaction, and the resulting set of hypotheses may exclude hypotheses that do not include the particular partitioned area.

The samples in the event data may be processed to generate event vector data. The generation of the event vector data may be considered continuous, in the sense that a stream of the samples as organized by timestamp are processed with respect to one another. For example, the event vector data may express a change from one sample to the next. The event vector data may indicate a change in weight along one or more physical axes of the fixture with respect to a total weight change. Within the multi-dimensional vector space (that is, a vector space described by two or more axes), the direction and angle of an event vector specified by the event vector data may be used to determine whether the interaction in the event was a pick or a place as well as the location of an interaction with respect to the fixture. The event vector data may be calculated for each sample within the event data, may be calculated using the samples corresponding to the event, or may be calculated for other intervals.

A hypothesis selection module may accept as input the event vector data and the set of hypotheses. The hypotheses may be evaluated using the event vector data. The event vector data may be interpreted to provide information about the location of a weight change during an event and whether the event involves a pick or place. The event vector data may also be used to determine the total weight change at the fixture. For example, the weight changes indicated by the event vector data for a particular partitioned area may be integrated to determine the total weight change during the time of the event for each of the partitioned areas. By using this information, hypotheses involving those partitioned areas which have weight changes may be retained for further consideration, while those which do not may be removed from consideration.

Each hypothesis may have a probability value associated with it that is indicative of a likelihood that the hypothesis is accurate to the actual interaction. For example, the probability value of "0.9" may indicate that a particular hypothesis has a 90% probability of being correct. In one implementation, the hypotheses may be ranked by the hypothesis selection module. For example, the hypotheses may be ranked by their probability value. The hypothesis exhibiting the highest probability value may be designated as a solution.

In another implementation, the ranking of the hypotheses may utilize a refinement factor. The refinement factor may comprise a value that is indicative of a change in weight associated with the particular hypothesis. The refinement factor may take into account such attributes as the known weight of the type of item, tolerance for signal noise in the weight signals, and so forth. A rank value may be calculated as a product of the probability value and the refinement factor. By sorting the rank values, the highest rank value may be determined, and the hypothesis associated with that highest rank value is designated as the solution.

In some implementations, it may be useful to validate occurrence of an event, or otherwise validate the data in the hypothesis that has been selected as a solution. An event validation module may access non-weight data, such as image data obtained from cameras, to remove spurious events, determine occurrence of an event, and so forth. For example, a camera may be arranged with a field of view encompassing the fixture. The image data from this camera may be processed to determine motion and associate it with a particular partitioned area. Continuing the example, image processing may be used to detect movement and map the movement to a first partitioned area. An event which does not correspond to this first partitioned area may be removed from consideration. Other techniques may also be utilized to use the weight data in conjunction with non-weight data to refine the hypotheses that are generated, refine the hypotheses that are selected, and so forth.

By using the devices and techniques described herein, operation of the facility may be improved. Complex sets of operations, such as numerous picks and places occurring at a fixture in rapid succession may be processed to generate accurate interaction data. For example, as items are picked, placed, and so forth, information such as quantity on hand at a given time may be readily determined. As a result, the inventory management system may be able to quickly track what item a user has interacted with, maintain up-to-date item data, and so forth.

Illustrative System

FIG. 1 illustrates a system 100 to determine interaction data about a fixture, such as a shelf, according to some implementations. A shelf 102, or other fixture, is equipped with a plurality of weight sensors 104. Each weight sensor 104 is configured to generate information indicative of a weight applied thereto. For example, the weight sensor 104 may comprise a load cell that supports at least a portion of the shelf 102. The weight sensors 104 are described in more detail below. As depicted here, the shelf 102 is measured using four weight sensors 104(0), 104(1), 104(2), and 104(3). Each weight sensor 104 is located at the four corners of the rectangular shelf 102. For example, the weight sensor 104(0) is located at a rear left corner, while the weight sensor 104(3) is located at a rear right corner. In other implementations, other arrangements of weight sensors 104 may be utilized.

The shelf 102 may be divided into one or more partitioned areas 106. The partitioned areas 106 are areas upon the shelf 102 that is associated with a particular type of item 108. For example, the shelf 102 depicted here has three partitioned areas 106(1), 106(2), and 106(3). Partitioned area 106(1) may be associated with storing some quantity of item 108(1) such as cat food, while partitioned area 106(2) may be associated with storing some quantity of item 108(2) such as dog food, and partitioned area 106(3) may be associated with storing some quantity of item 108(3) such as fish food.

A user 110 may interact with the shelf 102 or the partitioned areas 106 at the shelf 102. For example, the user 110 may remove item 108(1) from the partitioned area 106(1). The user 110 may then return the item 108(1) to the shelf 102. Several users 110 may interact with the same shelf 102 in quick succession.

An inventory management system 112 may be configured, as described below, to perform various functions with regard to a facility. To perform these functions, the inventory management system 112 may accept weight data 114 indicative of the weight as measured by the weight sensors 104. For example, the weight sensors 104 may send weight signals to a computing device of the shelf 102 that then generates the weight data 114, which includes weight values and timestamps indicative of when those weight values were obtained. In some implementations, the computing device of the shelf 102 may provide various functions, such as filtering or otherwise conditioning the weight signals, generating and transmitting the weight data 114, and so forth.

The inventory management system 112 may maintain and utilize item data 116 and physical layout data 118. The item data 116 comprises information about a particular type of item 108. The item data 116 may include information indicative of a weight of a single item 108, or a package, kit, or other grouping considered to be a single item 108. The item data 116 may include other characteristics of that type of item 108 such as: physical dimensions, characteristics about how the item 108 appears, and so forth. For example, the item data 116 may comprise a plurality of local descriptor values generated by feature extraction algorithms, parameters for classifiers, neural network configuration data, and so forth, that characterizes the appearance of a representative one or more of the item 108. The item data 116 may indicate the types and quantities of items 108 that are expected to be stored at that particular fixture such as in a particular lane on a shelf 102. The item data 116 may include other data. For example, the other data may comprise weight distribution of the item 108, point cloud data for the item 108, and so forth.

The physical layout data 118 may provide information indicative of where fixtures are in the facility, location of sensors, information about sensor orientation and field of view (where applicable), and so forth. For example, the physical layout data 118 may comprise information representative of a map or floor plan of the facility with relative positions of fixtures, planogram data indicative of how types of items 108 are to be arranged at the fixtures, and so forth. In another example, the physical layout data 118 may comprise information indicating the particular placement of weight sensors 104 on a particular shelf 102.

The inventory management system 112 may include or have access to an analysis module 120. During operation, the analysis module 120 may access one or more the weight data 114, the item data 116, the physical layout data 118, or other data to generate interaction data 122. For example, the facility may include other sensors 124, such as cameras having a field of view 126 that includes at least a portion of the shelf 102 or other fixture. The sensors 124 generate sensor data, such as image data 128 from the camera. The interaction data 122 provides information about an interaction, such as a pick of an item 108 from the fixture, a place of an item 108 to the fixture, a touch made to an item 108 at the fixture, a gesture associated with an item 108 at the fixture, and so forth. The interaction data 122 may include one or more of the type of interaction, interaction location identifier indicative of the fixture at which the interaction took place, an item identifier indicative of a type of item or particular item, quantity change to the item 108, user identifier, and so forth. The interaction data 122 may then be used to further update the item data 116. For example, the quantity of items 108 on hand at a particular partitioned area 106 on the shelf 102 may be changed based on an interaction that picks or places one or more items 108. Operation of the analysis module 120, including generation of the interaction data 122, is discussed in more detail below.

Figure 2:
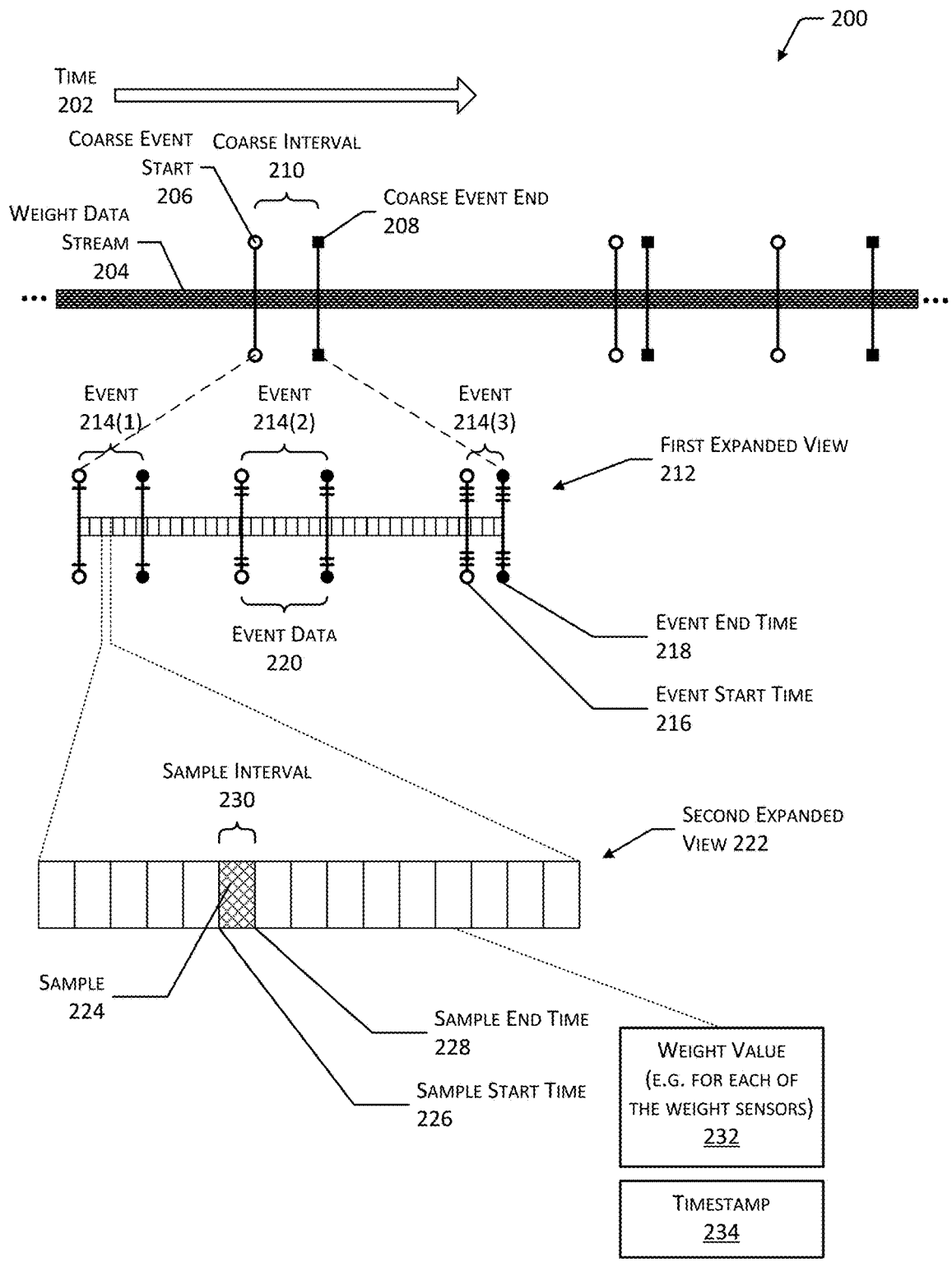
FIG. 2 is a diagram of weight data at different time scales, according to some implementations.

FIG. 2 is a diagram 200 of weight data 114 at different time scales, according to some implementations. In this illustration, time 202 is indicated by an arrow, and increases from left to right on the page.

A weight data stream 204 is depicted as a shaded horizontal bar. The weight data stream 204 may comprise a series of weight values resulting from after signal conditioning of the weight signals 302 produced by the weight sensors 104. The weight data stream 204 may be processed by a coarse event detection module to determine a coarse event. A coarse event, as described below, may include one or more discrete events.

The coarse event may be associated with a coarse event start 206 time and a coarse event end 208 time. A coarse interval 210 is the time extending from the coarse event start 206 time to the coarse event end 208 time. In some events, the coarse event may utilize one or more change detection algorithms to determine that a change in weight as expressed in the weight data stream 204 has taken place. For example, a moving average of the weight data 114 may exceed a threshold value, indicating a start or end of an event.

The coarse event determination may be implemented at least in part by a computing device or other electronics located at or near the fixture. The weight data 114 that includes the weight data 114 associated with the coarse event, such as occurring within the coarse interval 210, may be sent to the analysis module 120 for further processing.

A first expanded view 212 shows an enlargement along the time 202 axis. The weight data 114 of the coarse event may be processed to determine the presence of one or more events 214. The event 214 may be determined by utilizing one or more change detection algorithms to identify when the weight values have changed in such a way as to meet or exceed a threshold value. For example, the event 214 may be determined using a cumulative sum (CUSUM) function. The event 214 may be determined using sensor data obtained from non-weight sensors, such as image data obtained from cameras, touch data obtained from touch sensors, and so forth. For example, image data obtained from cameras monitoring the shelf 102 may be processed to detect motion, and that motion may be used to determine an event 214. Each event 214 is characterized by an event start time 216 and an event end time 218. These times may be determined using the timestamp data associated with underlying samples, as described below. Event data 220 comprises the information associated with or indicative of the event 214.

In some situations, such as a simple pick or place of a single item 108 from a single partitioned area 106, the coarse event may encompass a single event 214. In other situations, such as depicted here, the coarse event may include several events 214. For example, the coarse event here includes three different events 214(1), 214(2), and 214(3).

A second expanded view 222 shows a further enlargement along the time 202 axis for a particular portion of the event data 220. The event data 220 comprises a plurality of samples 224. Each sample 224 has a sample start time 226 and a sample end time 228 that encompass a sample interval 230. Each sample 224 may comprise a weight value 232, a timestamp 234, or other information. The sample interval 230 may be determined based on a sampling rate of the weight sensors 104. For example, the sampling rate of the weight sensors 104 may be 120 times per second, resulting in a sample interval of $\frac{1}{120}$ of a second, or approximately 8.3 milliseconds (ms). The weight value 232 may comprise information indicative of a weight measured by a particular weight sensor 104, while the timestamp 234 may indicate the time that weight value 232 was obtained. In some implementations, the weight value 232 may include an indexing value or other indicia that designates a particular weight sensor 104, along with a value indicative of the weight measured by that particular weight sensor 104.

Figure 3:
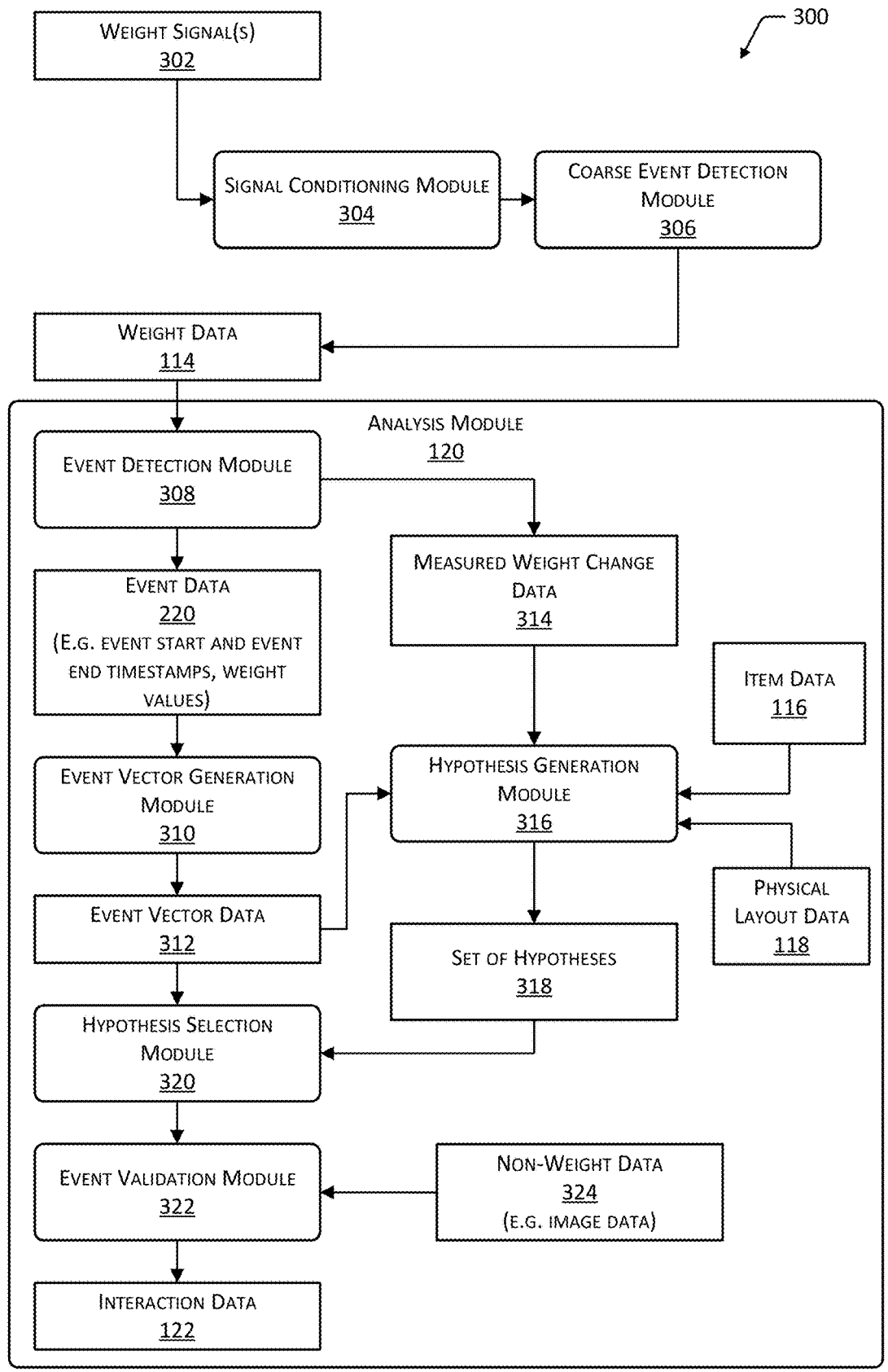
FIG. 3 is a block diagram of processing weight signals from weight sensors to determine interaction data, according to some implementations.

FIG. 3 is a block diagram 300 determining interaction data 122, according to some implementations. For example, the interaction data 122 may be indicative of a change in quantity of one or more types of items 108 stowed at the fixture. The process may be implemented at least in part by a computing device connected to the weight sensors 104, the inventory management system 112, and so forth. In different implementations, one or more of the blocks described below may be omitted, the sequence of the process using these blocks may vary from that depicted, and so forth.

Weight signals 302 that are generated by the weight sensors 104 are received by a signal conditioning module 304. For example, each weight sensor 104 may output an analog signal or digital weight signal 302 that is indicative of the weight measured by the weight sensor 104.

A signal conditioning module 304 accepts as input the weight signals 302 and processes the weight signals 302. For example, the weight signals 302 may be filtered, the weight signals 302 may be processed using analog circuitry or digital signal processors, and so forth. The signal conditioning module 304 may operate on weight signals 302 that are analog, digital, or a combination thereof. For example, a piece-wise-constant fitting algorithm for edge-preserving noise reduction of the weight signals 302 may be applied. This processing may result in weight values 232 for which noise has been reduced, while still leaving the edges resulting from a change in weight corresponding to an interaction such as a pick or place that changes the weight at the weight sensor 104.

The output from the signal conditioning module 304 may be used as input by a coarse event detection module 306. The coarse event detection module 306 is configured to determine when there has been a change in the weight values 232 that is significant enough to be indicative of a coarse event that includes one or more events 214. The coarse event detection module 306 may utilize one or more different techniques, such as step detection or edge detection algorithms to determine a change in weight values 232. The coarse event detection module 306 may generate the weight data 114. For example, the weight data 114 may comprise those weight values 232 obtained by the weight sensors 104 that occurred during the coarse interval 210. In some implementations, the weight data 114 may include at least a portion of the weight values 232 that precede the coarse event start 206 time and at least a portion of the weight values 232 occurring after the coarse event end 208 time.

An event detection module 308 may accept as input the weight data 114 and generate event data 220 as output. The event detection module 308 may utilize one or more techniques to determine the occurrence of an event 214. The determination of an event 214 may be based at least in part on a change in the weight values 232 that exceeds a threshold value. For example, the event detection module 308 may utilize one or more change or step detection algorithms to determine a change between weight values 232.

The event detection module 308 may utilize the same or a different algorithm or technique as used by the coarse event detection module 306. For example, the coarse event detection module 306 may utilize a sliding window algorithm to determine the coarse event start 206 and the coarse event end 208 of the coarse event, while the event detection module 308 may utilize a cumulative sum (CUSUM) algorithm to determine the occurrence of an event 214 and the respective event start time 216 and event end time 218. In some implementations, the time interval of the window may be about 250 milliseconds.

In some implementations, the event detection module 308 may be configured to only generate event data 220 for events 214 having a nonzero event weight change. The event weight change comprises a difference between an event start weight value and an event end weight value. The event start weight data may be determined as the weight value 232 obtained at or corresponding to the event start time 216. The event end weight data may be determined as the weight value 232 obtained at or corresponding to the event end time 218.

The event detection module 308 may also be used to determine if the weight data 114 before the event 214 is stable. The weight data 114 may be deemed stable when variation between successive samples 224 of weight data 114 is within a threshold value. Unstable weight data 114 may result in erroneous detection of events 214 and so forth. In one implementation, stability of the weight data 114 may be determined by comparing previously stored data indicative of the stable weight data 114 with the current weight data 114. For example, a frequency spectrum may indicate the frequency of occurrence of particular weight values over time. A stable frequency spectrum may be obtained during calibration or initial setup of the weight sensors 104. The stable frequency spectrum may comprise predominately high frequency weight values. During operation, a current frequency spectrum of the weight data 114 may be obtained and compared to the stable frequency spectrum. Continuing the example, the current frequency spectrum may differ from the stable frequency spectrum. A change in the spectra indicative of increased low frequency components may be indicative of unstable data, such as the user leaning on a shelf 102. For example, an (approximately) 10 Hz peak in the frequency spectrum may be deemed indicative of stable weight data 114, while a peak in the frequency spectrum that is less than (approximately) 5 Hz may indicate the weight data 114 is unstable. If the weight data 114 is deemed unstable, the event detection module 308 may disregard the event 214 associated with that instability. In one implementation the weight data 114 associated with unstable events 214 may be discarded. In another implementation, the weight data 114 may be merged into other events. For example, returning to FIG. 2, if the weight data 114 of event 214(1) is deemed to be unstable, event 214(1) and 214(2) may be merged into a single event 214.

The event data 220 may comprise information such as timestamps indicative of the event start time 216 and the event end time 218 of the particular events 214, weight values 232 and the associated timestamps 234 that comprise the event 214, and so forth.

An event vector generation module 310 accepts as input the event data 220. The event vector generation module 310 is configured to generate event vector data 312. The event vector data 312 comprises a vector value that is indicative of a movement or change in the center of gravity (CG) of the fixture during the event 214. The CG is indicative of a point, with respect to the fixture at a particular time, through which a mathematical resultant of a system of parallel forces formed by the weight of the fixture and any items supported thereby passed. For example, the CG may comprise a point upon which the fixture, if suitably suspended, balance. In another example, the CG comprises a point at which the net torque resulting from weight of the fixture sums to zero. The CG is indicative of an event location, that is, a particular physical location with respect to the fixture, such as a point on a shelf 102. For example, the weight values 232 associated with the event start time 216 may be used to calculate a first CG. The first CG is indicative of a first location on the fixture. The weight values 232 associated with the event end time 218 may be used to calculate a second CG. The event vector may be described as originating at coordinates indicative of the first location and ending at coordinates indicative of the second location.

The event vector data 312 may provide information about the type of interaction (such as a pick or place), the location of the interaction with respect to the fixture, the total weight change associated with the interaction, and so forth. The event vector data 312 may be described as a vector value descriptive of a change in the CG of the fixture. The time interval used to determine the event vector data 312 may be a based on two samples 224. For example, the event vector data 312 may be determined using the weight values 232 in a first sample 224(1) and the weight values 232 in a second sample 224(2) that is later in time than the first sample 224(1).

In some implementations, the event vector generation module 310 may generate event vector data 312 using samples 224 that occur before an event start time 216, after an event end time 218, or both. For example, the event vector data 312 may be generated using samples 224 that occur prior to the event start time 216. This event vector data 312 may be analyzed to determine if there is an event vector that exceeds one or more threshold values. If the threshold values are exceeded, this may indicate that the weight data 114 associated with the event 214 may not be stable, and thus further estimations may result in inaccurate results. Threshold values may be expressed in terms of vector angles, vector magnitudes, and so forth. In another example, precursor vector data, similar to the event vector data 312, may be calculated for a plurality of pairs of samples 224 occurring before the event start time 216. Continuing the example, the precursor vectors exhibit a consistent direction in vector space. This provides an indication that the weight data 114 obtained from the weight sensors 104 is the result of an interaction, as compared to just noise.

The event vector data 312 may be calculated as described next. Weight values 232 with respect to time t are denoted here as $w_0(t)$, $w_1(t)$, $w_2(t)$, and $w_3(t)$, following an anti-clockwise numbering convention, beginning from the weight sensor 104 located towards the back-left location on the shelf 102, as indicated in FIG. 1. For each non-zero incremental change in the weight measured during the event 214, the event vector data 312 is given by:

$$\bar{x}(t) = \left\{ x_L\left(\frac{\partial w_0(t)}{\partial t} + \frac{\partial w_1(t)}{\partial t}\right) + x_R\left(\frac{\partial w_2(t)}{\partial t} + \frac{\partial w_3(t)}{\partial t}\right) \right\} /$$
$$\left(\frac{\partial w_0(t)}{\partial t} + \frac{\partial w_1(t)}{\partial t} + \frac{\partial w_2(t)}{\partial t} + \frac{\partial w_3(t)}{\partial t}\right),$$
$$= x_L + \left(\frac{x_R - x_L}{2}\right)\left(1 - \frac{\partial w_X(t)}{\partial w_T(t)}\right),$$

$$\bar{y}(t) = \left\{ y_F\left(\frac{\partial w_1(t)}{\partial t} + \frac{\partial w_2(t)}{\partial t}\right) + y_B\left(\frac{\partial w_0(t)}{\partial t} + \frac{\partial w_3(t)}{\partial t}\right) \right\} /$$
$$\left(\frac{\partial w_0(t)}{\partial t} + \frac{\partial w_1(t)}{\partial t} + \frac{\partial w_2(t)}{\partial t} + \frac{\partial w_3(t)}{\partial t}\right),$$
$$= y_F + \left(\frac{y_B - y_F}{2}\right)\left(1 - \frac{\partial w_Y(t)}{\partial w_T(t)}\right).$$

where $x_L$ denotes the x spatial coordinates of the left weight sensors 104(0) and 104(1) and $x_R$ denotes the x spatial coordinates of the right weight sensors 104(2) and 104(3); and $y_F$ denotes the y spatial coordinates of the front weight sensors 104(1) and 104(2), and $y_B$ denotes the y spatial coordinates of the back weight sensors 104(0) and 104(3); and $$w_T(t) = w_0(t) + w_1(t) + w_2(t) + w_3(t),$$

$$w_X(t) = w_0(t) + w_1(t) - w_2(t) - w_3(t),$$

$$w_Y(t) = -w_0(t) + w_1(t) + w_2(t) - w_3(t). \quad \text{Equation 1}$$

An interaction that occurs within a particular partitioned area 106 or other spatial region on the shelf 102 exhibits event vector data 312 that is unique to that particular partitioned area 106. For example, as illustrated in the following figures, the angle of the event vector data 312 may be used to determine the location on the shelf 102, such as a particular partitioned area 106. For example, a particular angle, or range of angles, of the event vector with respect to an axis of the vector space is associated with a particular physical location on the shelf 102, such as a particular row or column. This particular physical location comprises an event location.

Given the event vector data 312, positive and negative weight changes (representing place and pick shopping actions, respectively) as measured between the event start time 216 $t^{start}$ and the event end time 218 $t^{end}$, in each partitioned area 106 designated i that is bounded by a rectangular region in space between $x_i^{start}=(x_i^{start}, y_i^{start})$ and $x_i^{end}=(x_i^{end}, y_i^{end})$ on the shelf 102 is estimated as:

$$w_-[i] =$$

$$\int_{t^{start}}^{t^{end}} \max\left(\frac{-\partial w_T(t)}{\partial t}, 0\right) I(x_i^{start} \leq \overline{x}(t) \leq x_i^{end}) I(y_i^{start} \leq \overline{y}(t) \leq y_i^{end}) dt,$$

$$w_+[i] = \int_{t^{start}}^{t^{end}} \max\left(\frac{\partial w_T(t)}{\partial t}, 0\right) I(x_i^{start} \leq \overline{x}(t) \leq x_i^{end}) I(y_i^{start} \leq \overline{y}(t) \leq y_i^{end}) dt,$$

where I denotes a binary indicator function defined as 1 when the input is true and 0 when the input is false.

Equation 2

By using equation 2, estimates of the changes in weight may thus be determined using the event vector data 312 that describes the event vectors based on the weight values 232 of the samples 224. The changes indicated by a plurality of event vectors that are associated with a particular partitioned area 106 may be integrated together to produce the total weight change for that partitioned area 106.

Returning to the event detection module 308, the event detection module 308 may generate measured weight change data 314. The measured weight change data 314 may be indicative of a change in the weight as measured by the weight sensors 104 at the shelf 102 that occurs between the coarse event start 206 and the coarse event end 208.

A hypothesis generation module 316 may use as input the measured weight change data 314. Other input may include but is not limited to the item data 116, the physical layout data 118, or other sensor data. The hypothesis generation module 316 is configured to generate a set of hypotheses 318 that comport with the measured weight change data 314. For example, given the value of the measured weight change data 314, the hypothesis generation module 316 may determine hypotheses that would result in a predicted weight change that is within a threshold value of the measured weight change data 314. Each hypothesis in the set of hypotheses 318 may include information indicative of one or more of: one or more predicted types of item 108, one or more predicted partitioned areas 106, a predicted quantity of each of the one or more predicted types of items 108, or a probability value indicative of likelihood that the particular hypothesis is accurate. In some implementations, the hypothesis generation module 316 may be configured to iterate through the various permutations of predicted characteristics. For example, the hypothesis generation module 316 may iterate through all of the partitioned areas 106 that are associated with the particular shelf 102, and iterate through different combinations of pick or place of each of the types of items 108 stowed at the respective partitioned areas 106.

In some implementations, the hypothesis generation module 316 may accept as input the event vector data 312. For example, the angles of the vectors in the event vector data 312 may be assessed to determine which lanes have experienced a change in weight. The hypothesis generation module 316 may then be constrained to generate a set of hypotheses 318 that includes only those partitioned areas 106. As a result, the size of the set of hypotheses 318 may be reduced, allowing for faster generation of the set of hypotheses 318 and reducing the amount of computer resources used to assess the hypotheses such as described below. In other implementations, the set of hypotheses may be filtered such that only those hypotheses that include the partitioned areas 106 indicated by the vectors remain under consideration.

A hypothesis selection module 320 may accept as input the event vector data 312 as well as the set of hypotheses 318. The hypothesis selection module 320 is configured to assess the hypotheses in the set of hypotheses 318 to designate at least one hypothesis as a solution. The solution may comprise those predicted values of a particular hypothesis that have been deemed to accurately represent the details of an interaction with the shelf 102. In one implementation, the hypothesis selection module 320 may be configured to determine a subset of the set of hypotheses 318 based at least in part on the event vector data 312. For example, the subset may comprise those hypotheses that include at least one partitioned area 106 indicated by the event vector data 312.

The hypothesis selection module 320 may be configured to rank each of the hypotheses in the set of hypotheses 318 with respect to one another using a ranking value. In one implementation, the hypotheses may be sorted by their probability value (used as the ranking value), and the hypotheses having a greatest probability value may be deemed to be the solution.

In another implementation, the ranking value may be determined by multiplying a probability value for each of the hypotheses with a refinement factor to produce a refined score value. The hypotheses in the set of hypotheses 318 may then be sorted by their respective refined score values. The hypothesis having the greatest refined score value may be deemed the solution. The refinement factor is based on a change in weight associated with the particular hypothesis.

The refinement factors $r_j$, used in conjunction with a particular hypothesis may be defined by the following equation:

$$r_j = |P_j| \sqrt{\prod_{i \in P_j} s[i, j]},$$

$$s_{i,j} = \begin{cases} (w_+[i] - w_-[i])/(q[i, j]w[i]), & \text{if } q[i, j] - \tau \leq (w_+[i] - w_-[i])/w[i] \leq q[i, j] + \tau \\ 0, & \text{else} \end{cases}$$

where $i \in P_j$ refers to the set of partitioned areas 106 involved in the hypothesis j, $|P_j|$ refers to the cardinality of the set $P_j$, q[i, j] refers to the signed integer quantity (positive for places and negative for picks) of the item 108 placed/picked in the partitioned area 106 i according to the hypothesis j, w[i] is the known product weight in product space i, and T is a tolerance limit to account for signal noise. In one implementation, T may be set to 0.5.

Equation 3

For example, when a hypothesis j states that 2 items 108 were returned to partitioned area 106(4) (that is known to have items weighing 500 g) and 3 items 108 were picked from partitioned area 106(7) (known to have products weighing 300 g), then $P_j=\{4, 7\}$, q[4, j]=2, w[4]=500 g, q[7, j]=−3, and w[7]=300 g. The refinement factors allow the ranking of the original hypotheses to determine the hypothesis that corroborates best with the weights estimated in each partitioned area 106 during the event 214.

In some implementations, an event validation module 322 may be used to perform additional tests of the hypotheses. These additional tests may use information acquired from other sensors 124, such as non-weight data 324. Activity data may be generated that is indicative of a change that is determined to occur based at least in part on the non-weight data 324. The activity data may comprise information such as identification of a user, determination of movement, and so forth. For example, the event validation module 322 may utilize the image data 128 to generate activity data that is indicative of motion at the particular partitioned area 106 indicated by the solution at the time of the event 214. Continuing the example, if no motion is detected, the hypotheses involving that partitioned area 106 may have their rankings reduced, or may be removed from consideration entirely. Activity data that indicates a possible interaction may also increase the ranking of one or more hypotheses. For example, if the image data 128 is indicative of motion at the particular partitioned area 106, the hypotheses that include that particular partitioned area 106 may have their ranking increased, may have the probability value increased, and so forth.

In situations where the refined score or other value associated with the solution is less than a threshold value, the human operator may be involved. For example, the event data 220, the non-weight data 324, and so forth, that are associated with the same time and shelf 102 may be presented to a human operator via a user interface. The human operator may then provide input that selects a particular hypothesis as a solution or to generate a new solution.

Event validation module 322 may use the validated solution to generate interaction data 122. For example, the predicted characteristics of the solution may be used to generate interaction data 122 that indicates a particular quantity of a particular item was picked from a particular partitioned area 106.

In some implementations, the process operations described above or portions thereof may be triggered based on non-weight data 324. For example, the image data 128 obtained from a sensor 124 such as a camera having a field of view 126 that includes the shelf 102 may be used to detect activity, such as the presence of the user 110 or movement. Activity data indicative of this change may be generated. Upon determining the presence of an object, the analysis module 120 may be configured to begin processing weight data 114 obtained from the weight sensors 104 at the shelf 102. The coarse event start 206 and the coarse event end 208 may thus be determined based on the non-weight data 324. Continuing the example above, a start of an activity such as motion in the image data 128 at a particular time may be used to determine the coarse event start 206, while a cessation of that activity may be used to determine the coarse event end 208.

In some situations, the interaction data 122 may be indicative of a rummaging behavior. Rummaging involves an interaction in which items 108 are neither added to nor removed from the fixture, such as the shelf 102. For example, the user 110 may move items 108 around on the shelf 102, pick and then place the same item 108, and so forth. In some implementations, rummaging behavior may be determined when a change in total weight of the fixture from a first time to a second time is less than a threshold value and one or more events 214 occur between the first time and second time.

Figure 4:
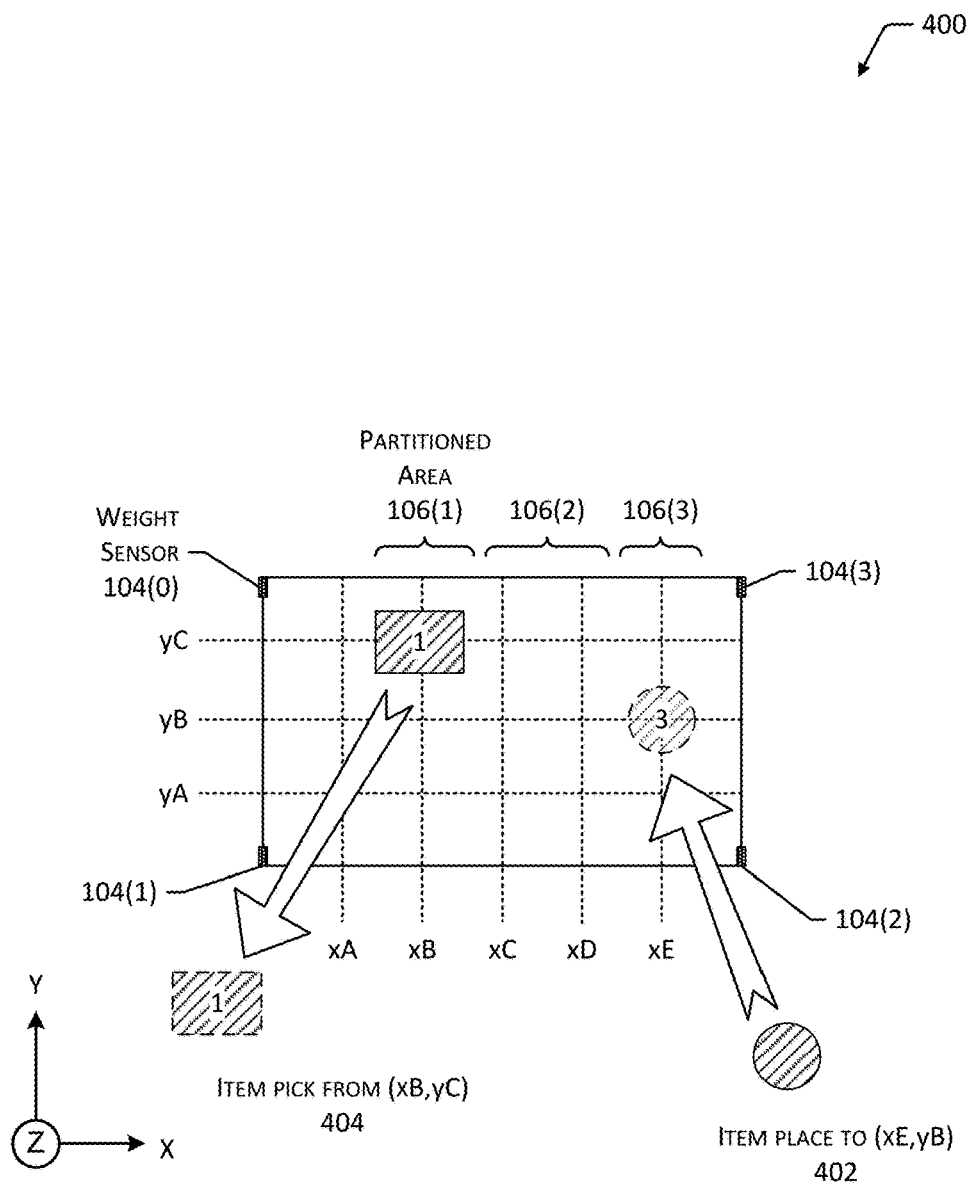
FIG. 4 illustrates a layout of a shelf segregated into partitioned areas, such as lanes, that is involved in an interaction, according to some implementations.

FIG. 4 illustrates a layout 400 of a shelf 102 segregated into partitioned areas 106 (such as lanes) that is involved in an interaction, according to some implementations. The fixture depicted comprises a shelf 102 with the weight sensors 104 arranged as described above with regard to FIG. 1. For the purposes of discussion, coordinate labels for several locations along the X and Y axes of the shelf 102 have been indicated, such as yC indicating a particular row and xC indicating a particular column. In this illustration, an X axis extends from a left to a right of the shelf 102, while a perpendicular Y axis extends from a front to a back of the shelf 102. As depicted, item 108(3) is being placed 402 to coordinates (xE, yB), and item 108(1) is being picked 404 from coordinates (xB, yC). For example, the item placement 402 may occur before the item pick 404.

Figure 5:
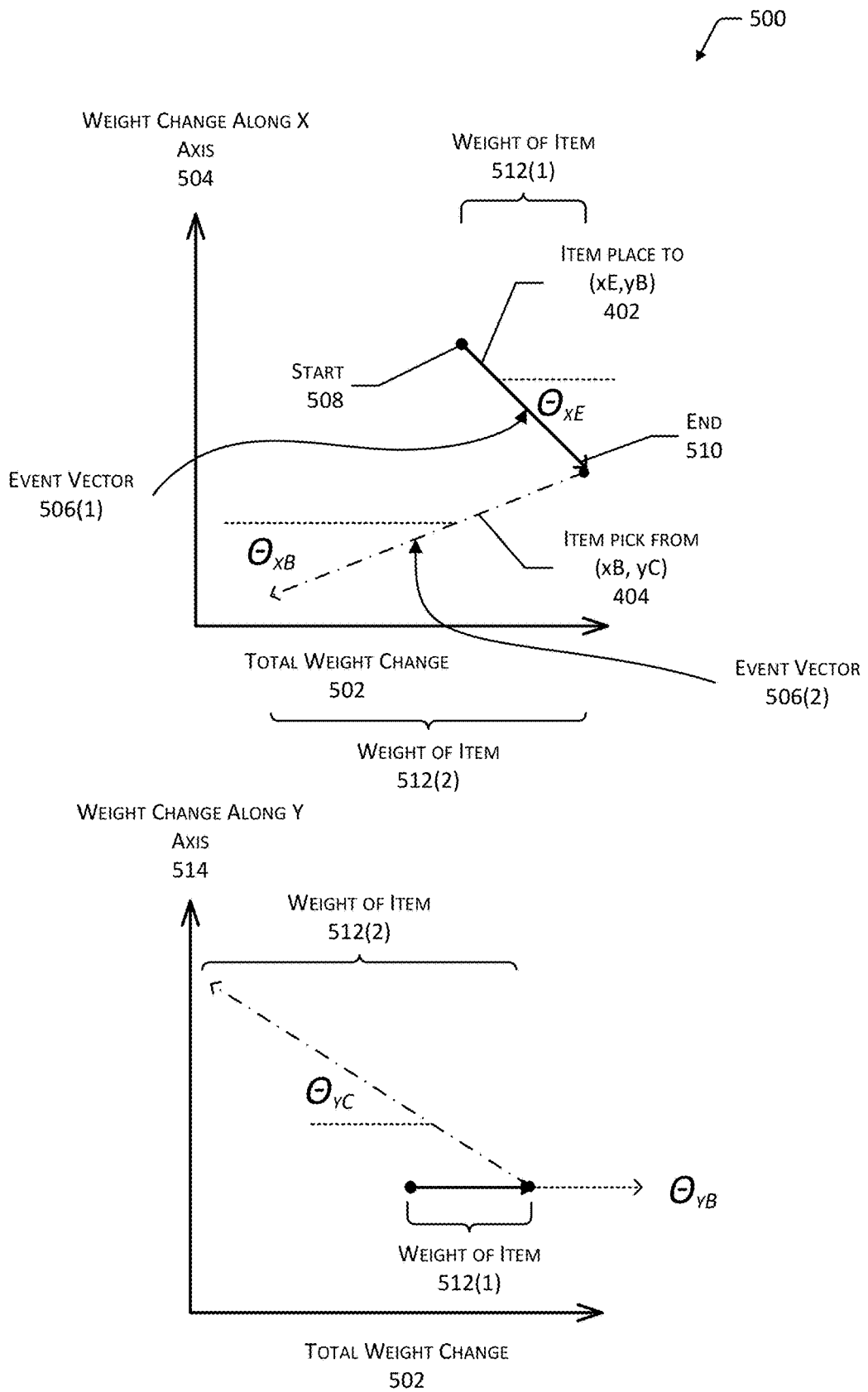
FIG. 5 illustrates event vector diagrams corresponding to the interaction of FIG. 4, according to some implementations.

FIG. 5 illustrates event vector diagrams 500 corresponding to the interaction of FIG. 4, according to some implementations. In this illustration, a first diagram depicts a total weight change 502 along a horizontal axis while a weight change along the X axis 504 of the shelf 102 is depicted on a vertical axis. For example, the vertical axis depicted here shows the change in weight along the width of the shelf 102 depicted in FIG. 4. Shown in this figure are event vectors 506 that are based on the event vector data 312. For example, the event vector 506(1) is associated with the item place 402, while the event vector 506(2) is associated with the item pick 404. Each event vector 506 exhibits a start and an end. Each event vector 506 describes an angle θ with respect to the axes of the vector space. For example, the event vector 506(1) describes an angle $θ_{xE}$ with respect to the horizontal total weight change 502 axis. The weight of item 512 may be indicated by a projection of the event vector 506 onto the total weight change 502 axis. For example, the weight of item 512(1) involved in the event vector 506(1) is the horizontal distance between the start 508 and the end 510 of the event vector 506(1).

Also depicted is a similar diagram in which the total weight change 502 is present along a horizontal axis but the vertical axis indicates a weight change along the Y axis 514 of the shelf 102. Similar to that described above with regard to the X axis, a weight of item 512 may be determined by looking at the projection of the event vector 506 onto the total weight change 502 axis. Similarly, each event vector 506 describes an angle θ with respect to the axes of the vector space. For example, the event vector 506(1) describes an angle $θ_{yB}$ with respect to the horizontal total weight change 502 axis.

The event vector data 312, as illustrated by the event vectors 506 in this figure, may be used to determine information about interactions. For example, the angle θ of the event vector 506 with respect to the axes of the vector space provides information indicative of a particular location, such as a particular partitioned area 106. The direction of the vector provides information as to whether the type of interaction was a pick or place. The magnitude of the vector may be used to determine the weight of the item 512.

Since subsequent events 214 may have different interactions, a series of interactions may be determined by looking at the sequence of event vectors 506. For example, the item place 402 and the item pick 404 may occur within the same coarse interval 210. The coarse event detection module 306 may not be configured to resolve individual events 214. The event detection module 308 and subsequent process described above may determine the individual events 214 and the corresponding event vector data 312 for each.

Figure 6:
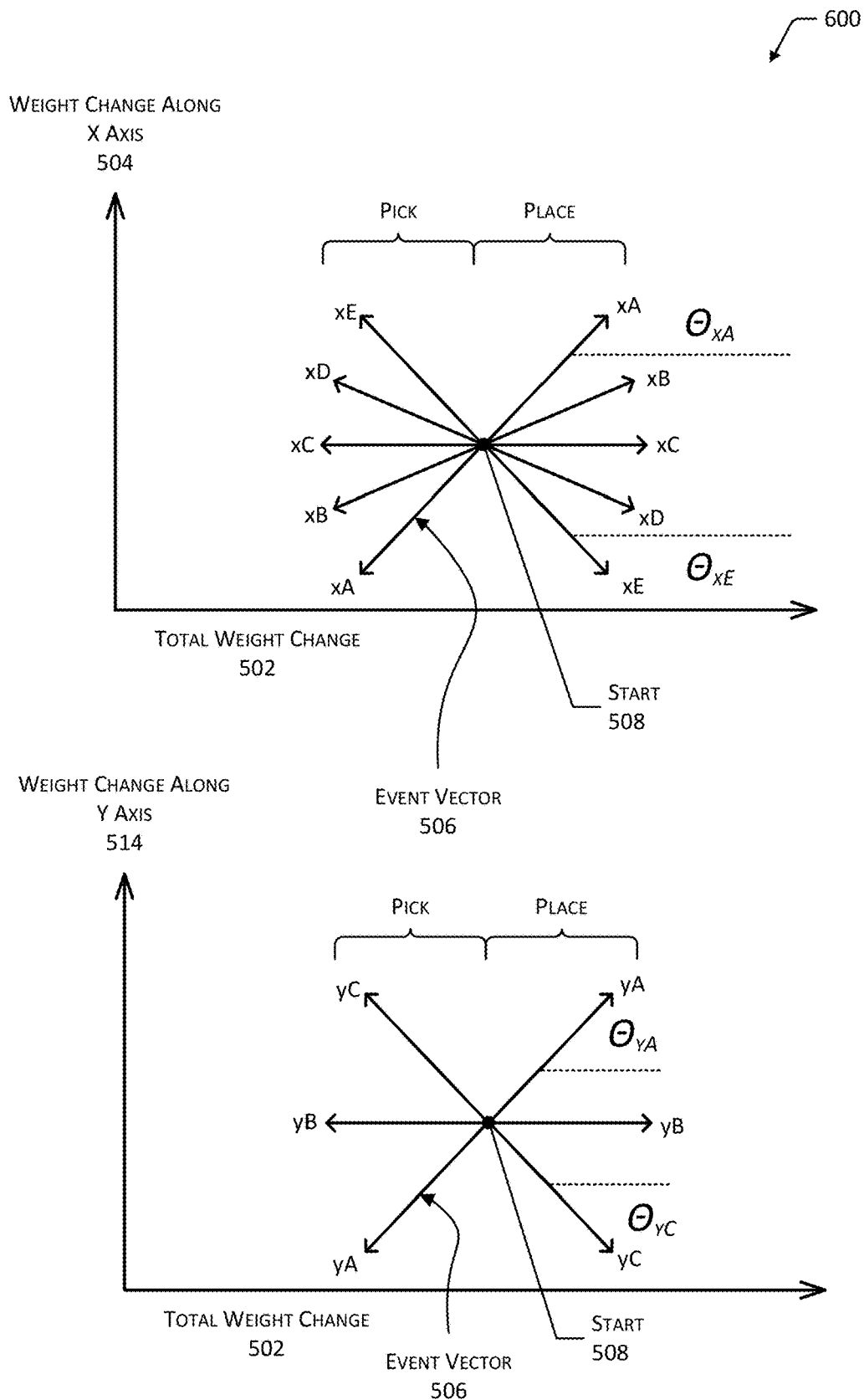
FIG. 6 illustrates event vector diagrams associated with the layout of FIG. 4, according to some implementations.

FIG. 6 illustrates event vector diagrams 600 associated with the layout of FIG. 4, according to some implementations. These event vector diagrams 600 depict various event vectors 506 and indicate the associated location along a respective physical axis of the shelf 102. As above, a first diagram depicts total weight change 502 along a horizontal axis while the weight change along an X axis 504 is depicted as a vertical axis. A second diagram depicts the total weight change 502 along a horizontal axis while the weight change along a Y axis 514 is depicted as a vertical axis.

Referring to the coordinate labels depicted in FIG. 4, several different possibilities of event vector 506 are illustrated. The event vectors 506 for the various hypotheses in the set of hypotheses 318 may be determined and compared with previously determined event vectors 506. For example, a library may be generated that represents the event vectors 506 depicted here and their corresponding physical locations with respect to the shelf 102. By comparing the vector described in the event vector data 312 that is based on the weight data 114, it is thus possible to determine a location on the shelf 102 that is associated with the change in weight. For example, an angle of the event vector data 312 for the example in FIG. 4 for event vector 506(1) may be calculated and used to look up the angle θ associated with a particular partitioned area 106. A particular angular range may be associated with a particular partitioned area 106. For example, the partitioned area 106(1) that includes coordinates xB may correspond to event vectors 506 having an angle θ with respect to the total weight change 502 axis that falls within a range of 41° to 48°. In some implementations, the angular range that is associated with a particular partitioned area 106 or other location on the shelf 102 may be dynamically adjusted. Continuing the above example, at some times the angle θ for that partitioned area 106(1) may be reduced to 44° to 46°. A data structure, such as a table, linked list, and so forth, may be used to associate a particular angle or angular range with a particular partitioned area 106.

Figure 7:
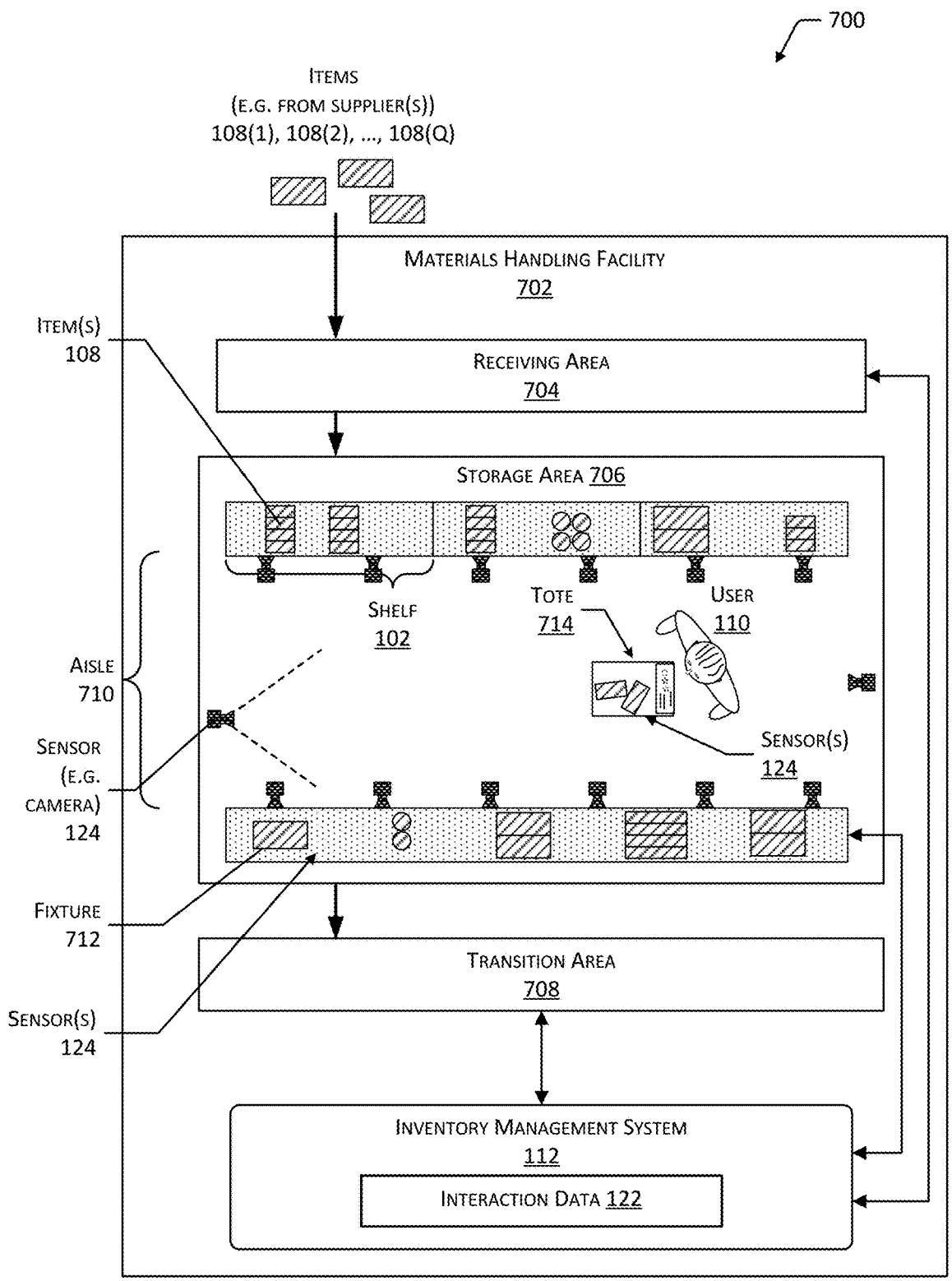
FIG. 7 is a block diagram illustrating a materials handling facility (facility) using the system, according to some implementations.

FIG. 7 is a block diagram 700 illustrating a materials handling facility (facility) 702 using the system 100, according to some implementations. A facility 702 comprises one or more physical structures or areas within which one or more items 108(1), 108(2), . . . , 108(Q) may be held. As used in this disclosure, letters in parenthesis such as "(Q)" indicate an integer value greater than or equal to zero. The items 108 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 108, such as from suppliers, for intake into the facility 702. For example, the receiving area 704 may include a loading dock at which trucks or other freight conveyances unload the items 108. In some implementations, the items 108 may be processed, such as at the receiving area 704, to generate at least a portion of the item data 116. For example, an item 108 may be imaged or otherwise scanned to develop reference images or representations of the item 108 at the receiving area 704.

The storage area 706 is configured to store the items 108. The storage area 706 may be arranged in various physical configurations. In one implementation, the storage area 706 may include one or more aisles 710. The aisle 710 may be configured with, or defined by, fixtures 712 on one or both sides of the aisle 710. The fixtures 712 may include one or more of a shelf 102, a rack, a case, a cabinet, a bin, a floor location, or other suitable storage mechanisms for holding, supporting, or storing the items 108. For example, the fixtures 712 may comprise shelves 102 with partitioned areas 106 designated therein. The fixtures 712 may be affixed to the floor or another portion of the structure of the facility 702. The fixtures 712 may also be movable such that the arrangements of aisles 710 may be reconfigurable. In some implementations, the fixtures 712 may be configured to move independently of an outside operator. For example, the fixtures 712 may comprise a rack with a power source and a motor, operable by a computing device to allow the rack to move from one location within the facility 702 to another.

One or more users 110(1), 110(2), . . . , 110(U) and totes 714(1), 714(2), . . . , 714(T) or other material handling apparatus may move within the facility 702. For example, the user 110 may move about within the facility 702 to pick or place the items 108 in various fixtures 712, placing them on the tote 714 for ease of transport. The tote 714 is configured to carry or otherwise transport one or more items 108. For example, the tote 714 may include a basket, cart, bag, bin, and so forth. In other implementations, other material handling apparatuses such as robots, forklifts, cranes, aerial drones, and so forth, may move about the facility 702 picking, placing, or otherwise moving the items 108. For example, a robot may pick an item 108 from a first fixture 712(1) and move the item 108 to a second fixture 712(2).

One or more sensors 124 may be configured to acquire information in the facility 702. The sensors 124 may include, but are not limited to, cameras 124(1), depth sensors 124(2), weight sensors 104, optical sensor arrays 124(13), proximity sensors 124(6), and so forth. The sensors 124 may be stationary or mobile, relative to the facility 702. For example, the fixtures 712 may contain weight sensors 104 to generate weight signals 302, cameras 124(1) to acquire images of picking or placement of items 108 on shelves 102, optical sensor arrays 124(13) to detect shadows of the user's 110 hands at the fixtures 712, and so forth. In another example, the facility 702 may include a camera 124(1) to obtain images of the user 110 or other objects in the facility 702. The sensors 124 are discussed in more detail below with regard to FIG. 8.

While the storage area 706 is depicted as having one or more aisles 710, fixtures 712 storing the items 108, sensors 124, and so forth, it is understood that the receiving area 704, the transition area 708, or other areas of the facility 702 may be similarly equipped. Furthermore, the arrangement of the various areas within the facility 702 is depicted functionally rather than schematically. For example, in some implementations, multiple different receiving areas 704, storage areas 706, and transition areas 708 may be interspersed rather than segregated in the facility 702.

The facility 702 may include, or be coupled to, an inventory management system 112. The inventory management system 112 is configured to interact with users 110 or devices such as sensors 124, robots, material handling equipment, computing devices, and so forth, in one or more of the receiving area 704, the storage area 706, or the transition area 708.

During operation of the facility 702, the sensors 124 may be configured to provide sensor data, or information based on the sensor data, to the inventory management system 112. The sensor data may include image data 128, non-image data, weight data 114 obtained from weight sensors 104, and so forth. The sensors 124 are described in more detail below with regard to FIG. 8.

The inventory management system 112 or other systems may use the sensor data to track the location of objects within the facility 702, movement of the objects, or provide other functionality. Objects may include, but are not limited to, items 108, users 110, totes 714, and so forth. For example, a series of images acquired by the camera 124(1) may indicate removal by the user 110 of an item 108 from a particular location on the fixture 712 and placement of the item 108 on or at least partially within the tote 714.

The facility 702 may be configured to receive different kinds of items 108 from various suppliers and to store them until a customer orders or retrieves one or more of the items 108. A general flow of items 108 through the facility 702 is indicated by the arrows of FIG. 7. Specifically, as illustrated in this example, items 108 may be received from one or more suppliers, such as manufacturers, distributors, wholesalers, and so forth, at the receiving area 704. In various implementations, the items 108 may include merchandise, commodities, perishables, or any suitable type of item 108, depending on the nature of the enterprise that operates the facility 702.

Upon being received from a supplier at the receiving area 704, the items 108 may be prepared for storage in the storage area 706. For example, in some implementations, items 108 may be unpacked or otherwise rearranged. The inventory management system 112 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 704, items 108 may be stored within the storage area 706. In some implementations, like items 108 may be stored or displayed together in the fixtures 712 such as in bins, on shelves 102, hanging from pegboards, and so forth. In this implementation, all items 108 of a given kind are stored in one fixture 712. In other implementations, like items 108 may be stored in different fixtures 712. For example, to optimize retrieval of certain items 108 having frequent turnover within a large physical facility 702, those items 108 may be stored in several different fixtures 712 to reduce congestion that might occur at a single fixture 712.

When a customer order specifying one or more items 108 is received, or as a user 110 progresses through the facility 702, the corresponding items 108 may be selected or "picked" from the fixtures 712 containing those items 108. In various implementations, item picking may range from manual to completely automated picking. For example, in one implementation, a user 110 may have a list of items 108 they desire and may progress through the facility 702 picking items 108 from fixtures 712 within the storage area 706 and placing those items 108 into a tote 714. In other implementations, employees of the facility 702 may pick items 108 using written or electronic pick lists derived from customer orders. These picked items 108 may be placed into the tote 714 as the employee progresses through the facility 702.

After items 108 have been picked, the items 108 may be processed at a transition area 708. The transition area 708 may be any designated area within the facility 702 where items 108 are transitioned from one location to another or from one entity to another. For example, the transition area 708 may be a packing station within the facility 702. When the item 108 arrives at the transition area 708, the item 108 may be transitioned from the storage area 706 to the packing station. Information about the transition may be maintained by the inventory management system 112.

In another example, if the items 108 are departing the facility 702, a list of the items 108 may be obtained and used by the inventory management system 112 to transition responsibility for, or custody of, the items 108 from the facility 702 to another entity. For example, a carrier may accept the items 108 for transport with that carrier accepting responsibility for the items 108 indicated in the list. In another example, a user 110 may purchase or rent the items 108 and remove the items 108 from the facility 702. During use of the facility 702, the user 110 may move about the facility 702 to perform various tasks, such as picking or placing the items 108 in the fixtures 712.

To facilitate operation of the facility 702, the inventory management system 112 is configured to use the sensor data including the weight data 114 and other information such as the item data 116, the physical layout data 118, the non-weight data 324, and so forth, to generate interaction data 122.

The interaction data 122 may provide information about an interaction, such as a pick of an item 108 from the fixture 712, a place of an item 108 to the fixture 712, a touch made to an item 108 at the fixture 712, a gesture associated with an item 108 at the fixture 712, and so forth. The interaction data 122 may include one or more of the type of interaction, interaction location identifier indicative of where from the fixture 712 the interaction took place, item identifier, quantity change to the item 108, user identifier, and so forth. The interaction data 122 may then be used to further update the item data 116. For example, the quantity of items 108 on hand at a particular partitioned area 106 on the shelf 102 may be changed based on an interaction that picks or places one or more items 108.

The inventory management system 112 may combine or otherwise utilize data from different sensors 124 of different types, including the weight sensors 104. For example, weight data 114 obtained from weight sensors 104 at the fixture 712 may be used in conjunction with non-weight data 324 such as the image data 128 to determine the interaction data 122.

Figure 8:
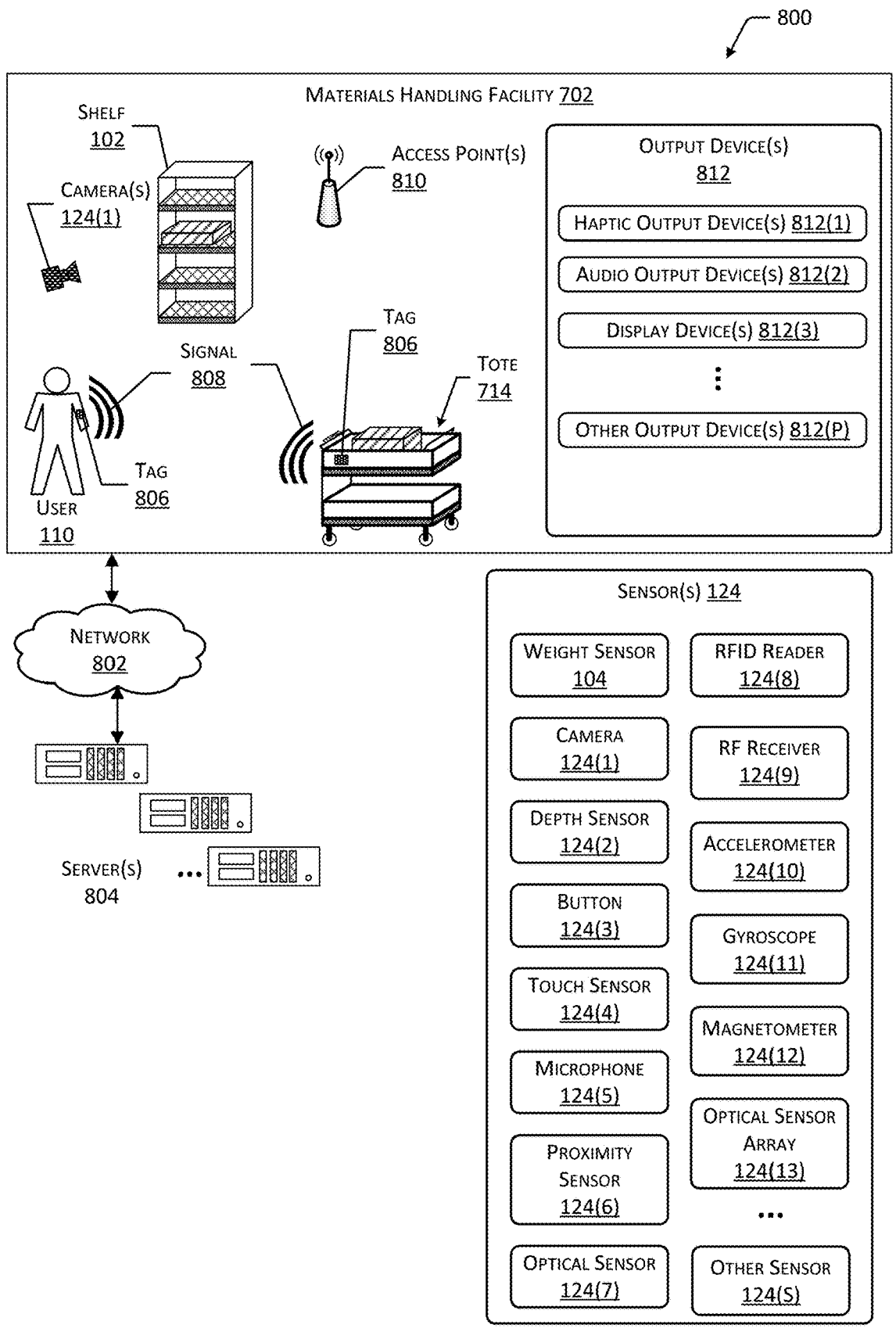
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 804 may be configured to execute one or more modules or software applications associated with the inventory management system 112 or other systems. While the servers 804 are illustrated as being in a location outside of the facility 702, in other implementations, at least a portion of the servers 804 may be located at the facility 702. The servers 804 are discussed in more detail below with regard to FIG. 9.

The users 110, the totes 714, or other objects in the facility 702 may be equipped with one or more tags 806. The tags 806 may be configured to emit a signal 808. In one implementation, the tag 806 may be a radio frequency identification (RFID) tag 806 configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 112 may be configured to use the tags 806 for one or more of identification of the object, determining a location of the object, and so forth. For example, the users 110 may wear tags 806, the totes 714 may have tags 806 affixed, and so forth, which may be read and, based at least in part on signal strength, used to determine identity and location.

Generally, the inventory management system 112 or other systems associated with the facility 702 may include any number and combination of input components, output components, and servers 804.

The one or more sensors 124 (including the weight sensors 104) may be arranged at one or more locations within the facility 702. For example, the sensors 124 may be mounted on or within a floor, wall, at a ceiling, at a fixture 712, on a tote 714, may be carried or worn by a user 110, and so forth.

The sensors 124 may include one or more weight sensors 104. The one or more weight sensors 104 are configured to measure the weight of a load, such as the item 108, the tote 714, or other objects. The weight sensors 104 may be configured to measure the weight of the load at one or more of the fixtures 712, the tote 714, on the floor of the facility 702, and so forth. For example, the shelf 102 may include a plurality of partitioned areas 106 or platforms, with one or more weight sensors 104 beneath each one to provide weight signals 302 about an individual partitioned area 106 or platform. The weight sensors 104 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 104 may operate as transducers that generate one or more signals based on an applied force, such as that of the load due to gravity. For example, the weight sensor 104 may comprise a load cell having a strain gauge and a structural member that deforms slightly when weight is applied. By measuring a change in the electrical characteristic of the strain gauge, such as capacitance or resistance, the weight may be determined. In another example, the weight sensor 104 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 112 may use the weight data acquired by the weight sensors 104 to identify an object, determine a change in the quantity of objects, determine a location of an object, maintain shipping records, and so forth.

The sensors 124 may include one or more cameras 124(1) or other imaging sensors. The one or more cameras 124(1) may include imaging sensors configured to acquire images of a scene. The cameras 124(1) are configured to detect light in one or more wavelengths including, but not limited to, terahertz, infrared, visible, ultraviolet, and so forth. The one or more cameras 124(1) may comprise charge coupled devices (CCD), complementary metal oxide semiconductor (CMOS) devices, microbolometers, and so forth. The inventory management system 112 may use image data 128 acquired by the one or more cameras 124(1) during operation of the facility 702. For example, the inventory management system 112 may identify items 108, users 110, totes 714, and so forth, based at least in part on their appearance within the image data 128 acquired by the one or more cameras 124(1). The one or more cameras 124(1) may be mounted in various locations within the facility 702. For example, a camera 124(1) may be mounted overhead, on fixtures 712, may be worn or carried by users 110, may be affixed to totes 714, and so forth.

One or more depth sensors 124(2) may also be included in the sensors 124. The depth sensors 124(2) are configured to acquire spatial or three-dimensional (3D) data, such as depth information, about objects within a field of view 126. The depth sensors 124(2) may include range cameras, lidar systems, sonar systems, radar systems, structured light systems, stereo vision systems, optical interferometry systems, and so forth. The inventory management system 112 may use the 3D data acquired by the depth sensors 124(2) to identify objects, determine a location of an object in 3D real space, and so forth. One or more buttons 124(3) may be configured to accept input from the user 110. The buttons 124(3) may comprise mechanical, capacitive, optical, or other mechanisms. For example, the buttons 124(3) may comprise mechanical switches configured to accept an applied force from a touch of the user 110 to generate an input signal. The inventory management system 112 may use data from the buttons 124(3) to receive information from the user 110. For example, the tote 714 may be configured with a button 124(3) to accept input from the user 110 and send information indicative of the input to the inventory management system 112.

The sensors 124 may include one or more touch sensors 124(4). The touch sensors 124(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 112 may use data from the touch sensors 124(4) to receive information from the user 110. For example, the touch sensor 124(4) may be integrated with the tote 714 to provide a touchscreen with which the user 110 may select from a menu one or more particular items 108 for picking, enter a manual count of items 108 at a fixture 712, and so forth.

One or more microphones 124(5) may be configured to acquire information indicative of sound present in the environment. In some implementations, arrays of microphones 124(5) may be used. These arrays may implement beamforming techniques to provide for directionality of gain. The inventory management system 112 may use the one or more microphones 124(5) to acquire information from acoustic tags 806, accept voice input from the users 110, determine ambient noise level, and so forth.

The sensors 124 may include proximity sensors 124(6) used to determine presence of an object, such as the user 110, the tote 714, and so forth. The proximity sensors 124(6) may use optical, electrical, ultrasonic, electromagnetic, or other techniques to determine a presence of an object. In some implementations, the proximity sensors 124(6) may use an optical emitter and an optical detector to determine proximity. For example, an optical emitter may emit light, a portion of which may then be reflected by the object back to the optical detector to provide an indication that the object is proximate to the proximity sensor 124(6). In other implementations, the proximity sensors 124(6) may comprise a capacitive proximity sensor 124(6) configured to provide an electrical field and determine a change in electrical capacitance due to presence or absence of an object within the electrical field.

The proximity sensors 124(6) may be configured to provide sensor data indicative of one or more of a presence or absence of an object, a distance to the object, or characteristics of the object. An optical proximity sensor 124(6) may use time-of-flight (ToF), structured light, interferometry, or other techniques to generate the distance data. For example, ToF determines a propagation time (or "roundtrip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 124 such as a camera 124(1). Based on an apparent distance between the features of the structured light pattern, the distance to the object may be calculated. Other techniques may also be used to determine distance to the object. In another example, the color of the reflected light may be used to characterize the object, such as skin, clothing, tote 714, and so forth.

The sensors 124 may include one or more optical sensors 124(7). The optical sensors 124(7) may be configured to provide data indicative of one or more of color or intensity of light impinging thereupon. For example, the optical sensor 124(7) may comprise a photodiode and associated circuitry configured to generate a signal or data indicative of an incident flux of photons. As described below, the optical sensor array 124(13) may comprise a plurality of the optical sensors 124(7). For example, the optical sensor array 124(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 124(7) may be used. The optical sensors 124(7) may be sensitive to one or more of infrared light, visible light, or ultraviolet light. For example, the optical sensors 124(7) may be sensitive to infrared light, and infrared light sources such as LEDs may provide illumination.

The optical sensors 124(7) may include photodiodes, photoresistors, photovoltaic cells, quantum dot photoconductors, bolometers, pyroelectric infrared detectors, and so forth. For example, the optical sensor 124(7) may use germanium photodiodes to detect infrared light.

One or more radio frequency identification (RFID) readers 124(8), near field communication (NFC) systems, and so forth, may be included as sensors 124. For example, the RFID readers 124(8) may be configured to read the RF tags 806. Information acquired by the RFID reader 124(8) may be used by the inventory management system 112 to identify an object associated with the RF tag 806 such as the item 108, the user 110, the tote 714, and so forth. For example, based on information from the RFID readers 124(8) detecting the RF tag 806 at different times and RFID readers 124(8) having different locations in the facility 702, a velocity of the RF tag 806 may be determined.

One or more RF receivers 124(9) may also be included as sensors 124. In some implementations, the RF receivers 124(9) may be part of transceiver assemblies. The RF receivers 124(9) may be configured to acquire RF signals 808 associated with Wi-Fi, Bluetooth, ZigBee, 2G, 3G, 4G, LTE, or other wireless data transmission technologies. In some implementations the RF receivers 124(9) may detect signals transmitted at frequencies such as below 15 MHz. The RF receivers 124(9) may provide information associated with data transmitted via radio frequencies, signal strength of RF signals 808, and so forth. For example, information from the RF receivers 124(9) may be used by the inventory management system 112 to determine a location of an RF source, such as a communication interface onboard the tote 714.

The sensors 124 may include one or more accelerometers 124(10), which may be worn or carried by the user 110, mounted to the tote 714, and so forth. The accelerometers 124(10) may provide information such as the direction and magnitude of an imposed acceleration. Data such as rate of acceleration, determination of changes in direction, speed, and so forth, may be determined using the accelerometers 124(10).

A gyroscope 124(11) may provide information indicative of rotation of an object affixed thereto. For example, the tote 714 or other objects may be equipped with a gyroscope 124(11) to provide data indicative of a change in orientation of the object.

A magnetometer 124(12) may be used to determine an orientation by measuring ambient magnetic fields, such as the terrestrial magnetic field. The magnetometer 124(12) may be worn or carried by the user 110, mounted to the tote 714, and so forth. For example, the magnetometer 124(12) mounted to the tote 714 may act as a compass and provide information indicative of which direction the tote 714 is oriented.

An optical sensor array 124(13) may comprise one or more optical sensors 124(7). The optical sensors 124(7) may be arranged in a regular, repeating, or periodic two-dimensional arrangement such as a grid. The optical sensor array 124(13) may generate image data 128. For example, the optical sensor array 124(13) may be arranged within or below a fixture 712 and obtain information about shadows of items 108, hand of the user 110, and so forth.

The sensors 124 may include other sensors 124(S) as well. For example, the other sensors 124(S) may include light curtains, ultrasonic rangefinders, thermometers, barometric sensors, hygrometers, and so forth. For example, the inventory management system 112 may use information acquired from thermometers and hygrometers in the facility 702 to direct the user 110 to check on delicate items 108 stored in a particular fixture 712, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf 102 in front of the fixture 712, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 110 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 110 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 110 may be used to trigger acquisition or selection of image data for processing by the analysis module 120.

The other sensors 124(S) may also include an instrumented auto-facing unit (AFU). The instrumented AFU may comprise a position sensor configured to provide data indicative of displacement of a pusher. As an item 108 is removed from the AFU, the pusher moves, such as under the influence of a spring, and pushes the remaining items 108 in the AFU to the front of the fixture 712. By using data from the position sensor, and given item data 116 such as a depth of an individual item 108, a count may be determined, based on a change in position data. For example, if each item 108 is 1 inch deep, and the position data indicates a change of 8 inches, the quantity held by the AFU may have changed by 8 items 108. This count information may be used to confirm or provide a cross check for a count obtained by other means, such as analysis of the image data 128.

In some implementations, the camera 124(1) or other sensors 124(S) may include hardware processors, memory, and other elements configured to perform various functions. For example, the camera 124(1) may be configured to generate image data 128, send the image data 128 to another device such as the server 804, and so forth.

The facility 702 may include one or more access points 810 configured to establish one or more wireless networks. The access points 810 may use Wi-Fi, NFC, Bluetooth, or other technologies to establish wireless communications between a device and the network 802. The wireless networks allow the devices to communicate with one or more of the sensors 124, the inventory management system 112, the optical sensor arrays 124(13), the tag 806, a communication device of the tote 714, or other devices.

Output devices 812 may also be provided in the facility 702. The output devices 812 are configured to generate signals, which may be perceived by the user 110 or detected by the sensors 124. In some implementations, the output devices 812 may be used to provide illumination of the optical sensor array 124(13).

Haptic output devices 812(1) are configured to provide a signal that results in a tactile sensation to the user 110. The haptic output devices 812(1) may use one or more mechanisms such as electrical stimulation or mechanical displacement to provide the signal. For example, the haptic output devices 812(1) may be configured to generate a modulated electrical signal, which produces an apparent tactile sensation in one or more fingers of the user 110. In another example, the haptic output devices 812(1) may comprise piezoelectric or rotary motor devices configured to provide a vibration, which may be felt by the user 110.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 110 or detected by a light-sensitive sensor such as a camera 124(1) or an optical sensor 124(7). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located on fixtures 712, totes 714, on the floor of the facility 702, and so forth.

Other output devices 812(P) may also be present. For example, the other output devices 812(P) may include scent/odor dispensers, document printers, 3D printers or fabrication equipment, and so forth.

Figure 9:
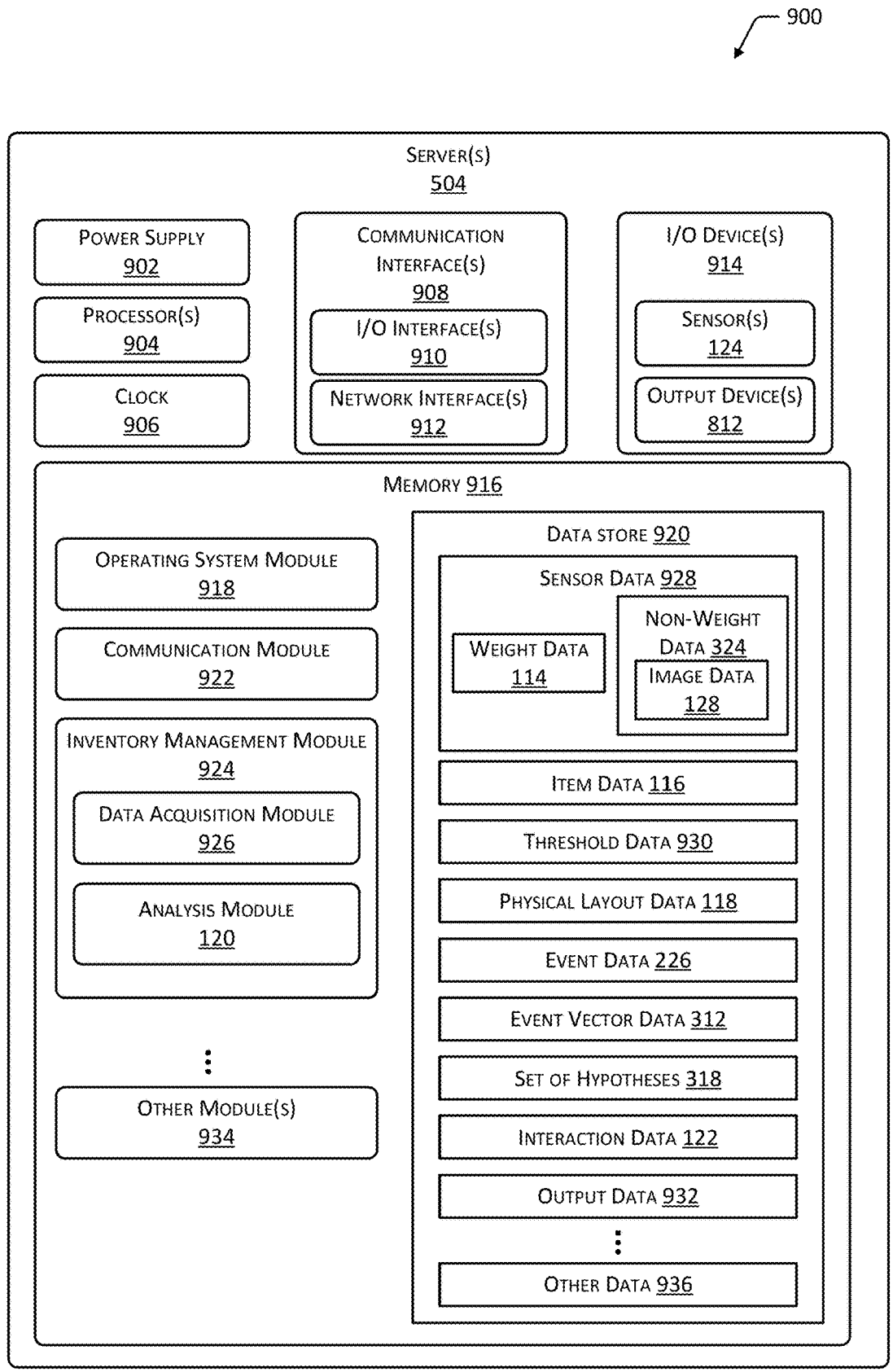
FIG. 9 is a block diagram of a server to support operation of the facility, according to some implementations.

FIG. 9 illustrates a block diagram 900 of a server 804 configured to support operation of the facility 702, according to some implementations. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 124, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, such as the totes 714, routers, access points 810, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 804, network attached storage devices, and so forth.

A communication module 922 may be configured to establish communications with one or more of the totes 714, sensors 124, display devices 812(3), other servers 804, or other devices. The communications may be authenticated, encrypted, and so forth.

The memory 916 may store an inventory management module 924. The inventory management module 924 is configured to provide the inventory functions as described herein with regard to the inventory management system 112. For example, the inventory management module 924 may track items 108 between different fixtures 712, to and from the totes 714, and so forth. The inventory management module 924 may access sensor data 928, threshold data 930, and so forth. The inventory management module 924 may generate output data 932. The sensor data 928 comprises information acquired by one or more the sensors 124, such as the image data 128. The threshold data 930 may comprise one or more thresholds. For example, the threshold value may specify thresholds for determination of a coarse event, the events 214, and so forth. In some implementations, the threshold data 930 may be determined from testing. For example, known items 108 may be picked or placed from the fixture 712 at known times to generate threshold values that are then stored as the threshold data 930.

The inventory management module 924 may include one or more of a data acquisition module 926 and the analysis module 120. The data acquisition module 926 may be configured to acquire and access information associated with operation of the facility 702. For example, the data acquisition module 926 may be configured to acquire sensor data 928, such as the weight data 114, the non-weight data 324 such as the image data 128, and so forth.

The analysis module 120 may operate as described above, and is configured to generate interaction data 122. The analysis module 120 may process other non-weight data 324, such as the image data 128. Processing of image data 128 may be performed by a module implementing, at least in part, one or more of the following tools or techniques. In one implementation, processing of the image data 128 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 128. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 928 or other data. For example, the ANN may be a trained using a supervised learning algorithm such that object identifiers are associated with images of particular objects within training images provided to the ANN. Once trained, the ANN may be provided with the sensor data 928 to make a determination of similarity between two or more images, provide object identification, and so forth.

Other modules 934 may also be present in the memory 916 as well as other data 936 in the data store 920. For example, the other modules 934 may include an accounting module while the other data 936 may include billing data. The accounting module may be configured to assess charges to accounts associated with particular users 110 or other entities, while the billing data may include information such as payment account numbers.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, using a processor, comprising:
accessing weight data obtained from a plurality of weight sensors, wherein the plurality of weight sensors measure a weight of a shelf;
determining event data indicative of an interval during which the weight measured by the plurality of weight sensors changed beyond a threshold value, wherein the event data specifies an event with an event start time and an event end time;
calculating a measured weight change based on a difference between start weight data obtained at the event start time and end weight data obtained at the event end time;
determining a set of hypotheses that exhibit a total predicted weight change that is within a second threshold value of the measured weight change, wherein each hypothesis in the set of hypotheses includes a predicted quantity change of a predicted item at a predicted lane on the shelf;
generating event vector data based on weight data obtained between the event start time and the event end time, wherein the event vector data is indicative of a plurality of vectors, each of the plurality of vectors expressing a change in a center of gravity (CG) of the shelf from one sample of weight data to another sample of weight data that was obtained during the interval;
determining, based on the event vector data, at least one of a plurality of lanes on the shelf that exhibited a change in weight;
determining, based on the at least one of the plurality of lanes on the shelf, a subset of hypotheses from the set of hypotheses by excluding hypotheses not inclusive of an interaction at the at least one of the plurality of lanes on the shelf;
determining a rank value for each of the hypotheses in the subset of hypotheses;
selecting a highest ranking hypothesis based on the rank value;
accessing image data acquired by a camera during the interval, the camera having a field of view encompassing at least a portion of the shelf;
determining, based on the image data, motion at the at least one of the plurality of lanes on the shelf between the event start time and the event end time;
validating the highest ranking hypotheses based on the determining the motion at the at least one of the plurality of lanes on the shelf; and
generating interaction data using the highest ranking hypothesis, wherein the interaction data is indicative of a quantity change of an item specified by the highest ranking hypothesis.

2. The method of claim 1 further comprising:
determining an angle of the each of the plurality of vectors with respect to an axis of a vector space, wherein the each of the plurality of vectors is expressed in a multi-dimensional vector space including at least a first axis indicative of weight and a second axis indicative of a first linear dimension corresponding to the shelf;
accessing data that associates an angular range with the at least one of the plurality of lanes; and
wherein the determining, based on the event vector data, the at least one of the plurality of lanes comprises determining the angle of the each of the plurality of vectors is within the angular range.

3. A system comprising:
a camera having a field of view that includes at least a portion of a fixture; and
a computing device comprising:
a memory, storing computer-executable instructions; and a hardware processor to execute the computer-executable instructions to:
receive image data acquired by the camera obtained between a first time and a second time;
determine, using the image data, occurrence of an activity comprising presence of a user or movement at the fixture between the first time and the second time;
responsive to determining the occurrence of the activity, access a series of weight values, wherein each weight value is associated with timestamp data that is indicative of a time the each weight value was acquired by one of a plurality of weight sensors measuring the fixture;
determine, based on the series of weight values, an interval extending from the first time to the second time;
determine event data indicative of one or more events occurring during the interval;
for at least one of the one or more events:
determine, using the series of weight values, an event vector indicative of movement of a center of gravity (CG) with respect to the fixture that occurs during the at least one of the one or more events; and
determine, based at least in part on the event vector, an event location with respect to the fixture;
determine a measured weight change based on weight values corresponding to the first time and the second time;
determine, based at least in part on the measured weight change, a first set of hypotheses;
determine a subset of hypotheses from the first set of hypotheses that excludes hypotheses not inclusive of an interaction at the event location;
select one of the hypotheses from the subset of hypotheses; and
generate, based on the one of the hypotheses that is selected, interaction data indicative of an interaction with the fixture.

4. The system of claim 3, wherein each hypothesis in the subset of hypotheses comprises:
one or more predicted types of item;
one or more predicted locations of the one or more predicted types of item; and
a predicted quantity of each of the one or more predicted types of item.

5. The system of claim 3, wherein the event data is determined using the computer-executable instructions to:
detect changes in the series of weight values during the interval that exceed a threshold level.

6. The system of claim 3, further comprising one or more non-weight sensors; and the hardware processor to further execute the computer-executable instructions to:
access sensor data obtained from the one or more non-weight sensors; and
confirm the event data indicative of the one or more events occurring during the interval based at least in part on the sensor data obtained from the one or more non-weight sensors.

7. The system of claim 3, wherein the event vector is determined using the computer-executable instructions to:
determine, based on weight values associated with an event start time, a first center of gravity indicative of a first location on the fixture;
determine, based on weight values associated with an event end time, a second center of gravity indicative of a second location on the fixture; and
wherein the event vector originates at coordinates indicative of the first location and ends at coordinates indicative of the second location.

8. The system of claim 3, wherein each hypothesis in the subset of hypotheses further comprises a probability value indicative of a likelihood that the each hypothesis is accurate; and
the hardware processor to further execute the computer-executable instructions to:
determine a ranking value for one or more of the hypotheses in the subset of hypotheses, wherein the ranking value comprises a product of the probability value for the each hypothesis and a refinement factor that is indicative of a change in weight associated with the each hypothesis.

9. The system of claim 3, the hardware processor to further execute the computer-executable instructions to:
determine weight data acquired before the first time is within a threshold value of weight data acquired at the first time; and
determine weight data acquired after the second time is within a second threshold value of weight data acquired at the second time.

10. The system of claim 3, the hardware processor to further execute the computer-executable instructions to:
determine the one or more events by processing the series of weight values using a cumulative sum (CUSUM) function.

11. The system of claim 3, the hardware processor to further execute the computer-executable instructions to:
determine an angle of the event vector with respect to one axis of a vector space, wherein the event vector is expressed in a multi-dimensional vector space including at least a first axis indicative of weight and a second axis indicative of a first linear dimension corresponding to the fixture; and
determine the event location associated with the angle.

12. The system of claim 3, wherein the interaction data is indicative of a change in quantity of one or more types of item stowed at the fixture.

13. The system of claim 3, wherein a plurality of events occur within the interval, and wherein the plurality of events includes one or more of a removal of a first quantity of one or more types of item from the fixture or an addition of a second quantity of the one or more types of items to the fixture.

14. The system of claim 3, wherein each event comprises an event start time and an event end time, and
the hardware processor to further execute the computer-executable instructions to:
determine, using the image data, movement of an object at a particular portion of the fixture occurring between the event start time and the event end time.

15. The system of claim 3, the hardware processor to further execute the computer-executable instructions to:
determine a first total weight of the fixture based on a summation of individual weight values associated with the first time;
determine the first total weight exceeds a first threshold value at the first time;
determine a second total weight of the fixture based on a summation of individual weight values associated with the second time; and determine the second total weight exceeds a second threshold value at the second time.

16. The system of claim 3, the hardware processor to further execute the computer-executable instructions to:
determine the first time based on a start of the activity; and
determine the second time based on a cessation of the activity.

17. A method, using a processor, comprising:
accessing weight data obtained from a plurality of weight sensors at a fixture, wherein the fixture is divided into a plurality of partitioned areas and the weight data is obtained at a sample interval;
determining event data indicative of an event occurring in the weight data;
determining a start time of the event and an end time of the event;
accessing image data acquired by a camera between the start time of the event and the end time of the event, the camera having a field of view encompassing at least a portion of the fixture;
determining, using the image data, movement of one or more types of items at the fixture between the start time of the event and the end time of the event;
determining, for the sample interval occurring between the start time of the event and the end time of the event, vector data comprising:
an incremental weight change from a beginning of the sample interval to an end of the sample interval; and
an event vector indicative of a change in a location of a center of gravity (CG) of the fixture during the sample interval;
determining one of the plurality of partitioned areas of the fixture that exhibited a change in weight based on the incremental weight change of the sample interval and the event vector;
determining a set of hypotheses, wherein each hypothesis in the set of hypotheses comprises:
one or more predicted locations based at least in part on the one of the plurality of partitioned areas;
one or more predicted types of items associated with the one or more predicted locations; and
a predicted quantity of each of the one or more predicted types of items;
selecting one of the hypotheses from the set of hypotheses; and
generating, based on the one of the hypotheses that is selected, interaction data indicative of one or more of addition or removal of a quantity of the one or more types of items at the fixture.

18. The method of claim 17, further comprising:
determining precursor vector data corresponding to an interval beginning before the start time of the event; and
determining the precursor vector data is less than or equal to one or more threshold values.

19. The method of claim 17, further comprising:
determining a first frequency spectrum comprising weight values over time for precursor vector data corresponding to an interval beginning before the start time of the event;
accessing a second frequency spectrum comprising a known stable state of the plurality of weight sensors; and
determining the first frequency spectrum is within a threshold tolerance of the second frequency spectrum.

20. The method of claim 17, further comprising:
determining a change in total weight of the fixture from a first time to a second time is less than a threshold value, wherein the event occurs between the first time and the second time; and
wherein the interaction data is further indicative of rummaging behavior in which no item is added to or removed from the fixture.

21. The method of claim 17, further comprising:
determining, for each hypothesis in the set of hypotheses, a probability value indicative of a likelihood that the each hypothesis is accurate; and
determining a ranking value for one or more of the hypotheses in the set of hypotheses, wherein the ranking value comprises a product of the probability value for the each hypothesis and a refinement factor r as calculated using this equation:

$$r_j = |P_j| \sqrt{\prod_{i \in P_j} s[i, j]},$$

$$s_{i,j} = \begin{cases} (w_+[i] - w_-[i])/(q[i,j]w[i]), & \text{if } q[i,j] - \tau \le (w_+[i] - w_-[i])/w[i] \le q[i,j] + \tau \\ 0, & \text{else} \end{cases}$$

wherein w is based on a total weight change, $i \in P_j$ refers to the one or more predicted locations involved in the each hypothesis j, $|P_j|$ refers to cardinality of the set $P_j$, q[i, j] refers to a signed integer quantity of the one or more predicted types of items added or removed from the one or more predicted locations i according to the each hypothesis j, w[i] is a known item weight of a type of item stowed in the one or more predicted locations i, and $\tau$ is a tolerance limit for signal noise.

22. The method of claim 17, the determining the event data indicative of the event occurring in the weight data comprising:
determining the event data indicative of the event by processing the weight data using a cumulative sum (CUSUM) function.

23. The method of claim 17, further comprising:
accessing non-weight data from one or more non-weight sensors;
determining, based on the non-weight data, a change at the one of the plurality of partitioned areas; and
wherein the determining the one of the plurality of partitioned areas is based at least in part on information indicative of the one of the plurality of partitioned areas exhibiting the change in weight.

24. The method of claim 17, wherein the event vector is expressed in a multi-dimensional vector space including at least a first axis indicative of weight and a second axis indicative of a first linear dimension corresponding to the fixture; the method further comprising:
determining an angle of the event vector with respect to the at least a first axis of the multi-dimensional vector space; and
determining a partitioned area of the fixture based at least on the angle.

25. A system comprising:
a shelf comprising a plurality of lanes;
a plurality of weight sensors that measure a weight of the shelf; and a computing device comprising:
  a memory storing computer-executable instructions; and
  a hardware processor to execute the computer-executable instructions to:
    access weight data acquired by the plurality of weight sensors;
    determine event data indicative of an event occurring within the weight data;
    determine measured weight change data for the event;
    determine a set of hypotheses for the event based on the measured weight change data;
    determine event vector data for the event, the event vector data indicative of vectors expressing a change in a center of gravity of the shelf;
    determine one of the plurality of lanes of the shelf that exhibited a change in weight based on the event vector data;
    generate a subset of hypotheses from the set of hypotheses for the event by excluding hypotheses from the set of hypotheses that are not inclusive of an interaction at the one of the plurality of lanes of the shelf; and
    select one of the hypotheses in the subset of hypotheses.

* * * * *

UNITED STATES PATENT AND TRADEMARK OFFICE
CERTIFICATE OF CORRECTION

| | |
|---|---|
| PATENT NO. | : 11,410,119 B1 |
| APPLICATION NO. | : 15/195964 |
| DATED | : August 9, 2022 |
| INVENTOR(S) | : Nikhil Chacko et al. |

Page 1 of 1

It is certified that error appears in the above-identified patent and that said Letters Patent is hereby corrected as shown below:

In the Claims

Column 28, Claim 1, Line 42:
Currently reads "validating the highest ranking hypotheses based on the".
Where it should read --validating the highest ranking hypothesis based on the--.

Column 29, Claim 3, Line 41:
Currently reads "selected, interaction data indicative of an interaction".
Where it should read --selected, interaction data indicative of the interaction--.

Column 29, Claim 5, Line 51:
Currently reads "using the computer-executable instructions to:".
Where it should read --using computer-executable instructions to:--.

Column 29, Claim 7, Line 64:
Currently reads "determined using the computer-executable instructions to:".
Where it should read --determined using computer-executable instructions to:--.

Column 30, Claim 12, Line 44:
Currently reads "item stowed at the fixture".
Where it should read --items stowed at the fixture--.

Column 30, Claim 13, Line 48:
Currently reads "or more types of item from the fixture or an addition of a".
Where it should read --or more types of items from the fixture or an addition of a--.

Column 30, Claim 14, Line 52:
Currently reads "an event start time and an event end time, and".
Where it should read --an event start time and an event end time; and--.

Signed and Sealed this
Eighteenth Day of October, 2022

*Katherine Kelly Vidal*

Katherine Kelly Vidal
*Director of the United States Patent and Trademark Office*